United States Patent
Gebara et al.

(10) Patent No.: US 7,123,676 B2
(45) Date of Patent: Oct. 17, 2006

(54) METHOD AND SYSTEM FOR ANTENNA INTERFERENCE CANCELLATION

(75) Inventors: Edward Gebara, Atlanta, GA (US); Joy Laskar, Marietta, GA (US); Emmanouil M. Tentzeris, Atlanta, GA (US); Andrew Joo Kim, Atlanta, GA (US)

(73) Assignee: Quellan, Inc., Atlanta, GA (US)

( * ) Notice: Subject to any disclaimer, the term of this patent is extended or adjusted under 35 U.S.C. 154(b) by 0 days.

(21) Appl. No.: 10/991,009

(22) Filed: Nov. 17, 2004

(65) Prior Publication Data

US 2005/0226353 A1    Oct. 13, 2005

Related U.S. Application Data

(60) Provisional application No. 60/520,592, filed on Nov. 17, 2003.

(51) Int. Cl.
*H04L 7/06* (2006.01)

(52) U.S. Cl. ...................................... 375/364

(58) Field of Classification Search ................ 375/364, 375/284, 285, 224; 455/63, 562, 78, 295; 342/357.1
See application file for complete search history.

(56) References Cited

U.S. PATENT DOCUMENTS

| | | | | |
|---|---|---|---|---|
| 2,632,058 A | 3/1953 | Gray | ................. | 178/15 |
| 3,445,771 A | 5/1969 | Clapham et al. | ................. | 325/42 |
| 3,571,725 A | 3/1971 | Kaneko et al. | ................. | 328/14 |
| 3,599,122 A | 8/1971 | Leuthoki | ................. | 333/29 |
| 3,714,437 A | 1/1973 | Kinsel | ................. | 359/185 |
| 3,806,915 A | 4/1974 | Higgins et al. | ................. | 340/347 |
| 3,977,795 A | 8/1976 | Buschmann | ................. | 356/256 |
| 4,201,909 A | 5/1980 | Dogliotti et al. | ................. | 455/608 |
| 4,287,756 A | 9/1981 | Gallagher | ................. | 73/61.1 R |
| 4,288,872 A | 9/1981 | Tamburelli | ................. | 375/14 |
| 4,349,914 A | 9/1982 | Evans | ................. | 375/40 |
| 4,363,127 A | 12/1982 | Evans et al. | ................. | 375/30 |
| 4,386,339 A | 5/1983 | Henry et al. | ................. | 340/347 |
| 4,387,461 A | 6/1983 | Evans | ................. | 371/5 |
| 4,393,499 A | 7/1983 | Evans | ................. | 371/5 |
| 4,410,878 A | 10/1983 | Stach | ................. | 340/347 |
| 4,464,771 A | 8/1984 | Sorensen | ................. | 375/120 |

(Continued)

FOREIGN PATENT DOCUMENTS

EP         0 527 966 B1    9/1994

(Continued)

OTHER PUBLICATIONS

André et al.; *InP DHBT Technolgoy and Design Methodology for High-Bit-Rate Optical Communications Circuits*; IEEE Journal of Solid-State Circuits; vol. 33, No. 9, Sep. 1998; pp. 1328-1335.

(Continued)

*Primary Examiner*—Khai Tran
(74) *Attorney, Agent, or Firm*—King & Spalding LLP

(57) ABSTRACT

A wireless communication system can comprise two or more antennas that interfere with one another via free space coupling, surface wave crosstalk, dielectric leakage, or other interference effect. The interference effect can produce an interference signal on one of the antennas. A cancellation device can suppress antenna interference by generating an estimate of the interference signal and subtracting the estimate from the interference signal. The cancellation device can generate the estimate based on sampling signals on an antenna that generates the interference or on an antenna that receives the interference. The cancellation device can comprise a model of the crosstalk effect. Transmitting test signals on the communication system can define or refine the model.

17 Claims, 11 Drawing Sheets

U.S. PATENT DOCUMENTS

| | | | |
|---|---|---|---|
| 4,470,126 A | 9/1984 | Haque | 364/825 |
| 4,475,227 A | 10/1984 | Belfield | 381/30 |
| 4,479,266 A | 10/1984 | Eumurian et al. | 455/608 |
| 4,521,883 A | 6/1985 | Roché | 370/100 |
| 4,580,263 A | 4/1986 | Watanabe et al. | 371/5 |
| 4,584,720 A | 4/1986 | Garrett | 455/608 |
| 4,618,941 A | 10/1986 | Linder et al. | 364/724 |
| 4,646,173 A | 2/1987 | Kammeyer et al. | 360/51 |
| 4,651,026 A | 3/1987 | Serfaty et al. | 307/269 |
| 4,751,497 A | 6/1988 | Torii | 340/347 |
| 4,830,493 A | 5/1989 | Giebeler | 356/328 |
| 4,847,521 A | 7/1989 | Huignard et al. | 307/425 |
| 4,864,590 A | 9/1989 | Arnon et al. | 375/14 |
| 4,873,700 A | 10/1989 | Wong | 375/76 |
| 4,912,726 A | 3/1990 | Iwamatsu et al. | 375/20 |
| 4,942,593 A | 7/1990 | Whiteside et al. | 375/118 |
| 4,953,041 A | 8/1990 | Huber | 360/46 |
| 4,959,535 A | 9/1990 | Garrett | 250/214 R |
| 4,978,957 A | 12/1990 | Hotta et al. | 341/156 |
| 5,007,106 A | 4/1991 | Kahn et al. | 455/619 |
| 5,008,957 A | 4/1991 | Kiyono | 455/618 |
| 5,012,475 A | 4/1991 | Campbell | 372/29 |
| 5,067,126 A | 11/1991 | Moore | 370/112 |
| 5,072,221 A | 12/1991 | Schmidt | 341/159 |
| 5,111,605 A | 5/1992 | Bossi | 307/270 |
| 5,113,278 A | 5/1992 | Degura et al. | 359/154 |
| 5,115,450 A | 5/1992 | Arcuri | 375/7 |
| 5,121,411 A | 6/1992 | Fluharty | 375/20 |
| 5,128,790 A | 7/1992 | Heidemann et al. | 359/132 |
| 5,132,639 A | 7/1992 | Blauvelt et al. | 330/149 |
| 5,151,698 A | 9/1992 | Pophillat | 341/52 |
| 5,181,034 A | 1/1993 | Takakura et al. | 341/144 |
| 5,181,136 A | 1/1993 | Kavehrad et al. | 359/190 |
| 5,184,131 A | 2/1993 | Ikeda | 341/165 |
| 5,208,833 A | 5/1993 | Erhart et al. | 375/20 |
| 5,222,103 A | 6/1993 | Gross | 375/54 |
| 5,223,834 A | 6/1993 | Wang et al. | 341/136 |
| 5,225,798 A | 7/1993 | Hunsinger et al. | 333/165 |
| 5,237,590 A | 8/1993 | Kazawa et al. | 375/20 |
| 5,243,613 A | 9/1993 | Gysel et al. | 372/26 |
| 5,252,930 A | 10/1993 | Blauvelt | 330/149 |
| 5,282,072 A | 1/1994 | Nazarathy et al. | 359/157 |
| 5,283,679 A | 2/1994 | Wedding | 359/154 |
| 5,291,031 A | 3/1994 | MacDonald et al. | 250/577 |
| 5,293,406 A | 3/1994 | Suzuki | 375/59 |
| 5,300,930 A | 4/1994 | Burger et al. | 341/96 |
| 5,321,543 A | 6/1994 | Huber | 359/187 |
| 5,321,710 A | 6/1994 | Cornish et al. | 372/26 |
| 5,327,279 A | 7/1994 | Farina et al. | 359/180 |
| 5,343,322 A | 8/1994 | Pirio et al. | 359/173 |
| 5,351,148 A | 9/1994 | Maeda et al. | 359/124 |
| 5,355,240 A | 10/1994 | Prigent et al. | 359/161 |
| 5,361,156 A | 11/1994 | Pidgeon | 359/161 |
| 5,371,625 A | 12/1994 | Wedding et al. | 319/173 |
| 5,373,384 A | 12/1994 | Hebert | 359/161 |
| 5,376,786 A | 12/1994 | MacDonald | 250/227.12 |
| 5,382,955 A | 1/1995 | Knierim | 341/64 |
| 5,387,887 A | 2/1995 | Zimmerman et al. | 333/166 |
| 5,408,485 A | 4/1995 | Ries | 372/38 |
| 5,413,047 A | 5/1995 | Evans et al. | 102/302 |
| 5,416,628 A | 5/1995 | Betti et al. | 359/181 |
| 5,418,637 A | 5/1995 | Kuo | 359/161 |
| 5,424,680 A | 6/1995 | Nazarathy et al. | 330/149 |
| 5,428,643 A | 6/1995 | Razzell | 375/308 |
| 5,428,831 A | 6/1995 | Monzello et al. | 455/296 |
| 5,436,752 A | 7/1995 | Wedding | 359/195 |
| 5,436,756 A | 7/1995 | Knox et al. | 359/260 |
| 5,444,864 A | 8/1995 | Smith | 455/84 |
| 5,450,044 A | 9/1995 | Hulick | 332/103 |
| 5,481,389 A | 1/1996 | Pidgeon et al. | 359/161 |
| 5,481,568 A | 1/1996 | Yada | 375/340 |
| 5,483,552 A | 1/1996 | Shimazaki et al. | 375/233 |
| 5,504,633 A | 4/1996 | Van Den Enden | 360/65 |
| 5,510,919 A | 4/1996 | Wedding | 359/115 |
| 5,515,196 A | 5/1996 | Kitajima et al. | 359/180 |
| 5,528,710 A | 6/1996 | Burton et al. | 385/16 |
| 5,541,955 A | 7/1996 | Jacobsmeyer | 375/222 |
| 5,548,253 A | 8/1996 | Durrant | 332/103 |
| 5,557,439 A | 9/1996 | Alexander et al. | 359/130 |
| 5,574,743 A | 11/1996 | van der Poel et al. | 372/46 |
| 5,589,786 A | 12/1996 | Bella et al. | 327/108 |
| 5,606,734 A | 2/1997 | Bahu | 455/303 |
| 5,612,653 A | 3/1997 | Dodds et al. | 333/124 |
| 5,617,135 A | 4/1997 | Noda et al. | 348/12 |
| 5,621,764 A | 4/1997 | Ushirokawa et al. | 375/317 |
| 5,625,360 A | 4/1997 | Garrity et al. | 341/144 |
| 5,625,722 A | 4/1997 | Froberg et al. | 385/1 |
| 5,644,325 A | 7/1997 | King et al. | 345/20 |
| 5,648,987 A | 7/1997 | Yang et al. | 375/232 |
| 5,670,871 A | 9/1997 | Man et al. | 324/96 |
| 5,675,600 A | 10/1997 | Yamamoto et al. | 372/38 |
| 5,678,198 A | 10/1997 | Lemson | 455/67.1 |
| 5,689,356 A | 11/1997 | Rainal | 359/181 |
| 5,691,978 A | 11/1997 | Kenworthy | 370/278 |
| 5,692,011 A | 11/1997 | Nobakht et al. | 375/233 |
| 5,699,022 A | 12/1997 | Tovar | 333/18 |
| 5,706,008 A | 1/1998 | Huntley, Jr. et al. | 341/156 |
| 5,721,315 A | 2/1998 | Evans et al. | 525/74 |
| 5,723,176 A | 3/1998 | Keyworth et al. | 427/163.2 |
| 5,751,726 A | 5/1998 | Kim | 371/6 |
| 5,754,681 A | 5/1998 | Watanabe et al. | 382/159 |
| 5,757,763 A | 5/1998 | Green, Jr. et al. | 369/275.3 |
| 5,761,243 A | 6/1998 | Russell et al. | 375/233 |
| 5,764,542 A | 6/1998 | Gaudette et al. | 364/574 |
| 5,774,505 A | 6/1998 | Baugh | 375/348 |
| 5,783,630 A | 7/1998 | Evans et al. | 525/74 |
| 5,784,032 A | 7/1998 | Johnston et al. | 343/702 |
| 5,790,595 A | 8/1998 | Benthin et al. | 375/224 |
| 5,798,854 A | 8/1998 | Blauvelt et al. | 359/161 |
| 5,801,657 A | 9/1998 | Fowler et al. | 341/155 |
| 5,802,089 A | 9/1998 | Link | 372/38 |
| 5,812,578 A | 9/1998 | Schemmann et al. | 372/46 |
| 5,825,211 A | 10/1998 | Smith et al. | 327/19 |
| 5,825,257 A | 10/1998 | Klymyshyn et al. | 332/100 |
| 5,825,825 A | 10/1998 | Altmann et al. | 374/293 |
| 5,828,329 A | 10/1998 | Burns | 341/155 |
| 5,835,848 A * | 11/1998 | Bi et al. | 455/24 |
| 5,839,105 A | 11/1998 | Ostendorf et al. | 704/256 |
| 5,841,841 A | 11/1998 | Dodds et al. | 379/93.08 |
| 5,844,436 A | 12/1998 | Altmann | 327/156 |
| 5,848,139 A | 12/1998 | Grover | 379/114 |
| 5,850,409 A | 12/1998 | Link | 372/38 |
| 5,850,505 A | 12/1998 | Grover et al. | 395/182.02 |
| 5,852,389 A | 12/1998 | Kumar et al. | 332/103 |
| 5,859,862 A | 1/1999 | Hikasa et al. | 372/38 |
| 5,861,966 A | 1/1999 | Ortel | 351/125 |
| 5,872,468 A | 2/1999 | Dyke | 327/72 |
| 5,878,390 A | 3/1999 | Kawai et al. | 704/231 |
| 5,880,870 A | 3/1999 | Sieben et al. | 359/181 |
| 5,883,910 A | 3/1999 | Link | 372/38 |
| 5,887,022 A | 3/1999 | Lee et al. | 375/202 |
| 5,889,759 A | 3/1999 | McGibney | 370/207 |
| 5,896,392 A | 4/1999 | Ono et al. | 371/5.2 |
| 5,912,749 A | 6/1999 | Harstead et al. | 359/123 |
| 5,920,600 A | 7/1999 | Yamaoka et al. | 375/376 |
| 5,923,226 A | 7/1999 | Kakura et al. | 333/18 |
| 5,942,576 A | 8/1999 | Evans et al. | 525/73 |
| 5,943,380 A | 8/1999 | Marchesani et al. | 375/376 |
| 5,943,457 A | 8/1999 | Hayward et al. | 385/24 |
| 5,949,926 A | 9/1999 | Davies | 385/3 |
| 5,959,032 A | 9/1999 | Evans et al. | 525/74 |
| 5,959,750 A | 9/1999 | Eskildsen et al. | 359/134 |
| 5,965,667 A | 10/1999 | Evans et al. | 525/74 |
| 5,968,198 A | 10/1999 | Hassan et al. | 714/752 |

| | | | | | | | |
|---|---|---|---|---|---|---|---|
| 5,978,417 | A | 11/1999 | Baker et al. ............... 375/232 | 6,473,131 | B1 | 10/2002 | Neugebauer et al. ....... 348/572 |
| 5,983,178 | A | 11/1999 | Naito et al. ................. 704/245 | 6,501,792 | B1 | 12/2002 | Webster ...................... 375/232 |
| 5,985,999 | A | 11/1999 | Dominguez et al. .......... 525/74 | 6,539,204 | B1 | 3/2003 | Marsh et al. .................. 455/63 |
| 5,999,300 | A | 12/1999 | Davies et al. ................ 359/183 | 6,560,257 | B1 | 5/2003 | DeSalvo et al. ......... 372/38.02 |
| 6,002,274 | A | 12/1999 | Smith et al. ................... 327/19 | 6,665,348 | B1 | 12/2003 | Feher ........................... 375/259 |
| 6,002,717 | A | 12/1999 | Gaudet ........................ 375/232 | 6,665,500 | B1 | 12/2003 | Snawerdt .................... 398/185 |
| 6,009,424 | A | 12/1999 | Lepage et al. .................. 707/6 | 6,718,138 | B1 | 4/2004 | Sugawara ....................... 398/9 |
| 6,011,952 | A | 1/2000 | Dankberg et al. ............. 455/24 | 6,751,587 | B1 | 6/2004 | Thyssen et al. ............. 704/228 |
| 6,021,110 | A | 2/2000 | McGibney ................... 370/208 | 6,816,101 | B1 | 11/2004 | Hietala et al. ............... 341/155 |
| 6,028,658 | A | 2/2000 | Hamada et al. ............. 352/129 | 6,819,166 | B1 | 11/2004 | Choi et al. ................... 327/551 |
| 6,031,048 | A | 2/2000 | Evans et al. ................... 525/73 | 6,961,019 | B1 * | 11/2005 | McConnell et al. ..... 342/357.1 |
| 6,031,866 | A | 2/2000 | Oler et al. ................... 375/219 | 2001/0024542 | A1 | 9/2001 | Aina et al. ..................... 385/24 |
| 6,031,874 | A | 2/2000 | Chennakeshu et al. ...... 375/262 | 2002/0086640 | A1 * | 7/2002 | Belcher ......................... 455/63 |
| 6,034,996 | A | 3/2000 | Herzberg .................... 375/265 | 2002/0196508 | A1 | 12/2002 | Wei et al. .................... 359/183 |
| 6,035,080 | A | 3/2000 | Henry et al. .................. 385/24 | 2003/0002121 | A1 | 1/2003 | Miyamoto et al. .......... 359/183 |
| 6,041,299 | A | 3/2000 | Schuster et al. ............. 704/232 | 2003/0008628 | A1 | 1/2003 | Lindell et al. ............ 455/180.1 |
| 6,052,420 | A | 4/2000 | Yeap et al. .................. 375/346 | 2003/0030876 | A1 | 2/2003 | Takei ........................... 359/187 |
| 6,072,364 | A | 6/2000 | Jeckeln et al. ............... 330/149 | 2003/0053534 | A1 | 3/2003 | Sivadas et al. .............. 375/229 |
| 6,072,615 | A | 6/2000 | Mamyshev ................... 359/183 | 2003/0058976 | A1 | 3/2003 | Ohta et al. ................... 375/350 |
| 6,078,627 | A | 6/2000 | Crayford ..................... 375/286 | 2003/0063354 | A1 | 4/2003 | Davidson .................... 359/189 |
| 6,084,931 | A | 7/2000 | Powell, II et al. ........... 375/355 | 2003/0067990 | A1 | 4/2003 | Bryant ........................ 375/259 |
| 6,091,782 | A | 7/2000 | Harano ........................ 375/287 | 2004/0197103 | A1 | 10/2004 | Roberts et al. ............. 398/159 |
| 6,093,496 | A | 7/2000 | Dominguez et al. ........ 428/500 | 2004/0213354 | A1 | 10/2004 | Jones et al. ................. 375/285 |
| 6,093,773 | A | 7/2000 | Evans et al. ................... 525/73 | 2004/0218756 | A1 | 11/2004 | Tang et al. .................. 379/417 |
| 6,108,474 | A | 8/2000 | Eggleton et al. ............ 385/122 | 2005/0069063 | A1 * | 3/2005 | Waltho et al. ............... 375/346 |
| 6,111,477 | A | 8/2000 | Klymyshyn et al. ........ 333/139 | | | | |
| 6,118,563 | A | 9/2000 | Boskovic et al. ............ 359/124 | | | | |
| 6,118,567 | A | 9/2000 | Alameh et al. .............. 359/189 | | | | |

FOREIGN PATENT DOCUMENTS

| | | |
|---|---|---|
| EP | 0 584 865 B1 | 3/2000 |
| GB | 2 223 369 A | 4/1990 |
| GB | 2 306 066 A | 4/1997 |
| JP | 62082659 | 10/1988 |
| JP | 1990000063162 | 11/1991 |
| JP | 04187738 | 7/1992 |
| JP | 08079186 A | 3/1996 |
| WO | WO 99/45683 A1 | 9/1999 |
| WO | WO 01/41346 A2 | 6/2001 |
| WO | WO 02/067521 A1 | 8/2002 |
| WO | WO 2002/082694 | 10/2002 |
| WO | WO 02/091600 A2 | 11/2002 |
| WO | WO 2003/071731 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/050896 | 6/2005 |

| | | | |
|---|---|---|---|
| 6,127,480 | A | 10/2000 | Dominguez et al. .......... 525/74 |
| 6,140,416 | A | 10/2000 | Evans et al. ................... 525/74 |
| 6,140,858 | A | 10/2000 | Dumont ....................... 327/317 |
| 6,140,972 | A | 10/2000 | Johnston et al. ............. 343/725 |
| 6,141,127 | A | 10/2000 | Boivin et al. ................ 359/124 |
| 6,141,387 | A | 10/2000 | Zhang ......................... 375/261 |
| 6,148,428 | A | 11/2000 | Welch et al. ................ 714/752 |
| 6,151,150 | A | 11/2000 | Kikuchi ....................... 359/194 |
| 6,154,301 | A | 11/2000 | Harvey ........................ 359/193 |
| 6,163,638 | A | 12/2000 | Eggleton et al. .............. 385/37 |
| 6,169,764 | B1 | 1/2001 | Babanezhad ................. 375/233 |
| 6,169,912 | B1 | 1/2001 | Zuckerman ................. 455/570 |
| 6,181,454 | B1 | 1/2001 | Nagahori et al. ............ 359/189 |
| 6,191,719 | B1 | 2/2001 | Bult et al. .................... 341/144 |
| 6,201,916 | B1 | 3/2001 | Eggleton et al. ............ 385/122 |
| 6,208,792 | B1 | 3/2001 | Hwang et al. ............... 385/129 |
| 6,211,978 | B1 | 4/2001 | Wojtunik ..................... 359/114 |
| 6,212,654 | B1 | 4/2001 | Lou et al. .................... 714/701 |
| 6,214,914 | B1 | 4/2001 | Evans et al. ................. 524/323 |
| 6,219,633 | B1 | 4/2001 | Lepage ............................ 704/9 |
| 6,222,861 | B1 | 4/2001 | Kuo et al. ..................... 372/20 |
| 6,226,112 | B1 | 5/2001 | Denk et al. .................. 359/138 |
| 6,236,963 | B1 | 5/2001 | Naito et al. .................. 704/243 |
| 6,259,836 | B1 | 7/2001 | Dodds ........................... 385/24 |
| 6,259,847 | B1 | 7/2001 | Lenz et al. ................... 385/131 |
| 6,268,816 | B1 | 7/2001 | Bult et al. .................... 341/144 |
| 6,271,690 | B1 | 8/2001 | Hirano et al. .................. 327/75 |
| 6,271,944 | B1 | 8/2001 | Schemmann et al. ....... 359/124 |
| 6,281,824 | B1 | 8/2001 | Masuda ....................... 341/144 |
| 6,288,668 | B1 | 9/2001 | Tsukamoto et al. ......... 341/172 |
| 6,289,055 | B1 | 9/2001 | Knotz .......................... 375/286 |
| 6,289,151 | B1 | 9/2001 | Kazarinov et al. ............ 385/32 |
| 6,295,325 | B1 | 9/2001 | Farrow et al. ............... 375/327 |
| 6,298,459 | B1 | 10/2001 | Tsukamoto .................. 714/746 |
| 6,304,199 | B1 | 10/2001 | Fang et al. ................... 341/118 |
| 6,311,045 | B1 | 10/2001 | Domokos ...................... 455/78 |
| 6,313,713 | B1 | 11/2001 | Ho et al. ....................... 333/1.1 |
| 6,317,247 | B1 | 11/2001 | Yang et al. .................. 359/245 |
| 6,317,469 | B1 | 11/2001 | Herbert ....................... 375/293 |
| 6,341,023 | B1 | 1/2002 | Puc .............................. 359/124 |
| 6,356,374 | B1 | 3/2002 | Farhan ........................ 359/180 |
| 6,388,786 | B1 | 5/2002 | Ono et al. .................... 359/181 |
| 6,411,117 | B1 | 6/2002 | Hatamian .................... 324/765 |
| 6,421,155 | B1 | 7/2002 | Yano ........................... 359/181 |
| 6,445,476 | B1 | 9/2002 | Kahn et al. .................. 359/184 |

OTHER PUBLICATIONS

Borjak et al.; *High-Speed Generalized Distribution-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Applicaiton for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15th Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Choi et al.; *A 0.18- μm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Downie et al.; *Performance Monitoring of Optical Networks with Synchronous and Asynchronous Sampling*; Corning Incorporated, Science and Technology; SP-AR-02-1; p. WDD50-1; Abstract.

Enning et al.; *Design and Test of Novel Integrate and Dump Filter (I&D) for Optical Gbit/s System Applications*; Electronics Letters; (Nov. 21, 1991); vol. 27, No. 24; pp. 2286-2288.

Fürst et al.; *Performance Limits of Nonlinear RZ and NRZ Coded Transmission at 10 and 40 Gb/s on Different Fibers*; pp. 302-304.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24$^{th}$ European Conference on Optical Communication; Sep. 1998; pp. 145-147.

Jutzi, Wilhelm; *Microwave Bandwidth Active Transversal Filter Concept with MESFETs*; IEEE Transactions on Microwave Theory and Technique, vol. MIT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobijnary 10-Gb/s Transmitter Setup Resulting in an Increased Transmission Distance*; IEEE Photonics Technology Letters; Aug. 2001; vol. 13; No. 8; pp. 884-886.

Lee et al.; *Effects of Decision Ambiguity Level on Optical Receiver Sensitivity*; IEEE Photonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No. 1; Jan. 1993; pp. 82-105.

Oehler et al.; *A 3.6 Gigasample/s 5 bit Analog to Digital Converter Using 0.3 µm AlGaAs-HEMT Technology*; IEEE; (1993); pp. 163-164.

Ohm et al.; *Quaternary Optical ASK-DPSK and Receivers with Direct Detection*; IEEE Photonics Technology Letters; Jan. 2003; Vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keyring (DPSK) Direct Detection Considered as a Duobinary Signal*; Proc. 27$^{th}$ Eur. Conf. on Opt. Comm. (ECOC'01—Amsterdam); vol. 3; Sep. 30 to Oct. 4, 2001; pp. 456-457.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Mutlilevel Modulation in OFDM Systems*; IEEE; (1998); pp. 821-824.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Runge et al.; *High-Speed Circuits for Lightwave Communications*; 1999; World Scientific, pp. 181-184.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

Shtaif et al.; *Limits on the Spectral Efficiency of Intensity Modulated Direct Detection Systems with Optical Amplifiers*; AT&T Labs Research; pp. MM1-1-MM1-3.

Su et al.; *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Vorenkemp et al.; *A 1Gs/s, 10b Digital-to-Analog Converter*; ISSCC94/Session 3/Analog Techniques/Paper WP 3.3; pp. 52-53.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al.; *Mutlilevel Signaling for Increasing the Reach of 10 Gb/s Lightwave Systems*; IEEE Journal of Lightwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

Wedding et al.; *Multi-Level Dispersion Supported Transmission at 20 Gbit/s Over 46 km Installed Standard Singlemode Fibre*; 22$^{nd}$ European Conference on Optical Communications; 1996; pp. 91-94.

Author: Unknown; *Digital Carrier Modulation Schemes*; Title: Unknown; Date: Unknown; pp. 380-442.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communication; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Williamson et al., *Performance Analysis of Adaptive Wideband Duplexer*; 2003 Australian Telecommunications, Networks and Applications Conference (ATNAC); Dec. 8-10, 2003.

\* cited by examiner

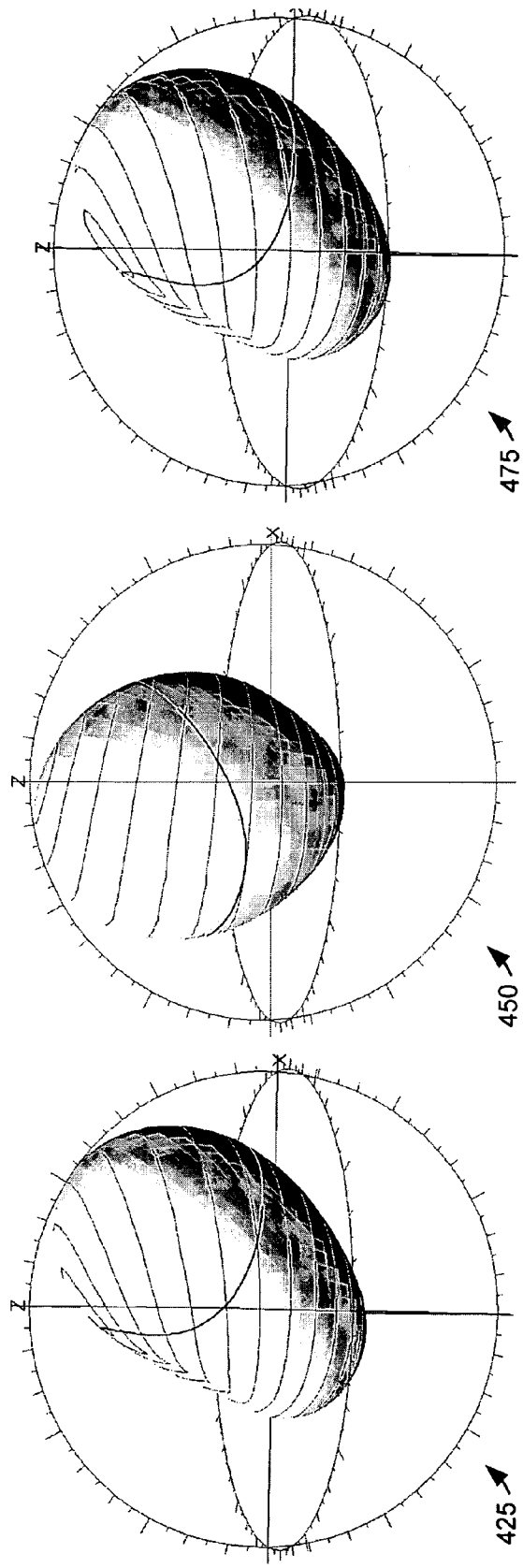

METHOD AND SYSTEM FOR ANTENNA INTERFERENCE CANCELLATION

CROSS REFERENCE TO RELATED APPLICATIONS

This application claims the benefit of priority to U.S. Provisional Patent Application Ser. No. 60/520,592, entitled "Improved Performance of Closely Spaced Antennas," and filed Nov. 17, 2003. The contents of U.S. Provisional Patent Application Ser. No. 60/520,592 are hereby incorporated by reference.

This application is related to U.S. Nonprovisional patent application Ser. No. 10/108,598, entitled "Method and System for Decoding Multilevel Signals," filed on Mar. 28, 2002, and U.S. Nonprovisional patent application Ser. No. 10/620,477, entitled "Adaptive Noise Filtering and Equalization for Optimal High Speed Multilevel Signal Decoding," filed on Jul. 15, 2003, and U.S. Nonprovisional patent application Ser. No. 10/911,915, entitled "Method and System for Crosstalk Cancellation," filed on Aug. 5, 2004. The contents of U.S. patent application Ser. No. 10/108,598 and U.S. patent application Ser. No. 10/620,477 and U.S. patent application Ser. No. 10/911,915 are hereby incorporated by reference.

FIELD OF THE INVENTION

The present invention relates to the field of wireless communications, and more specifically to improving the signal performance of a communication system having two or more adjacent antennas by compensating for crosstalk and coupling interference that can impair antenna performance.

BACKGROUND

Heightened consumption of communication services fuels a need for increased data carrying capacity or bandwidth in wireless communication systems. Phenomena known as crosstalk and interference often occur in these communication systems and can impair high-speed signal transmission and thus limit wireless communication bandwidth to an undesirably low level.

Crosstalk and related interference are conditions that arise in communication systems wherein a signal in one communication channel or antenna interferes with or bleeds into another channel or antenna or an associated structure, housing, material, active device, or conductor. Such interference may occur due to a variety of effects, including current leakage, surface wave propagation, line interference, and electromagnetic coupling.

Crosstalk is emerging as a significant barrier to increasing throughput rates of wireless communications systems. When not specifically addressed, crosstalk often manifests itself as noise. In particular, crosstalk degrades signal quality by increasing uncertainty in received signals, thereby making reliable communications more difficult and causing data errors to occur with increased probability. In other words, crosstalk typically becomes more problematic at increased data rates. Not only does crosstalk reduce signal integrity, but additionally, the amount of crosstalk often increases with bandwidth, thereby making higher data rate communications more difficult.

In a typical wireless communication system, circuit boards, connectors, and transmission lines handle the incoming and outgoing communication signals that enter or leave the system via communication antennas. At high communication speeds, the conductive paths of the system's circuit boards, connectors, and transmission lines pickup and radiate electromagnetic energy that can interfere with the performance of the system's receiving and sending antennas. The radiated energy from one antenna or an associated conductive channel undesirably couples into or is received by another antenna or its associated channel. This undesirable transfer of signal energy, known as "crosstalk" or "interference," can compromise signal or data integrity. Crosstalk typically occurs in a bidirectional manner in that a single antenna or channel can both radiate energy to one or more other antennas or channels and receive energy from one or more other antennas or channels.

Compact wireless communication devices are particularly susceptible to antenna-to-antenna crosstalk. The close proximity of the antennas in such systems can intensify the crosstalk effect and cause acute signal degradation. Such interference can affect multiple-antenna wireless applications, whether each antenna carries the same payload or a distinct payload. Further, interference between antennas can impair performance whether each antenna operates at the same frequency or at a unique frequency. In applications involving global positioning sensors ("GPS"), wireless fidelity ("WiFi"), "Bluetooth," or another wireless standard, each of two interfering antennas of a wireless device may operate at a different frequency and support one of these services. In antenna diversity systems and other applications having two or more antennas that each carries the same payload, crosstalk coupling can distort the radiation pattern of each antenna. The radiation pattern can also be affected whether the antennas operate in band or out of band, for example in applications other than antenna diversity.

Antenna diversity typically involves using two or more antennas to receive multiple instances of the same signal. The resulting signal redundancy enables the system to be robust against many factors that can degrade signal reliability, such as antenna type, antenna orientation, and beam obstacles. However, interference among the multiple antennas that are typically associated with antenna diversity can defeat the technique's benefits when the antennas are closely spaced to one another. Additionally, from a power budget perspective, it is beneficial to avoid unnecessarily resorting to activating dormant antennas for increased gain.

In multi-antenna systems, whether the antennas carry distinct or indistinct signals, maintaining an adequate level of antenna isolation is generally desirable. A minimum isolation of 15 dB is usually considered adequate for most applications. Using conventional technology, such isolation can be difficult to attain in miniaturized devices, such as handhelds, in which the antennas are physically close together. Without adequate isolation, reducing the spacing between antennas can negatively impact gain, directivity, throughput, beam shape, reach, efficiency, and receiver sensitivity. Because the amount of antenna-to-antenna coupling increases with closer antenna spacing, distances of 17–33% of the wavelength ("$\lambda$"), i.e. $\lambda/6$ to $\lambda/3$, are often considered a compromise between antenna isolation and compactness.

In an effort to achieve increased miniaturization, conventional canceller systems have been used to provide a limited level of isolation between interfering antennas. One type of conventional canceller system samples an interfering signal from a transmitting antenna and generates a cancellation signal that is adjusted in magnitude and phase to cancel leakage signals impinging on an adjacent antenna. This conventional technology is generally limited to addressing leakage signals, which are high-frequency currents, and usually does not adequately address other forms of interference such as surface wave crosstalk and free space coupling. Surface wave crosstalk can occur when electromagnetic waves propagate along the surface of a circuit board, mounting, or other structure that is proximate to two or more adjacent antennas. Via free space coupling, the electromagnetic field patterns of the adjacent antennas can undesirably distort or interact with one another in an open air propagation medium.

Conventional canceller systems may also attempt to maintain isolation of the signals that a transmit antenna generates to reduce the mixing of outgoing signals with incoming signals on a nearby receiving antenna. However, such conventional canceller systems generally do not adequately address all of the phenomena that can cause antenna-to-antenna interference or crosstalk. For example, the physical presence of the receive antenna can distort the radiation pattern of the system, even if the receive antenna is in a passive or dormant mode. This distortion can cause a receive antenna to undesirably radiate energy or can warp the field pattern of a nearby transmitting antenna. The presence of one receive antenna can also distort the receptive pattern of another receive antenna. Conventional canceller technologies generally neglect such secondary radiation effects that may occur in free space. In other words, these conventional canceller systems typically apply cancellation to address leakage-type crosstalk occurring within a device, but often do not adequately address crosstalk between two antenna field patterns in free space.

To address these representative deficiencies in the art, what is needed is a capability for crosstalk cancellation between two or more antennas disposed in physical proximity to one another. A need also exists for a capability to cancel crosstalk occurring between two antennas through free space coupling or via propagation of surface waves. Such capabilities would facilitate higher bandwidth and increased signal fidelity in wireless communication applications that may involve compact devices.

SUMMARY OF THE INVENTION

The present invention supports compensating for signal interference, such as crosstalk, occurring between two antennas or among more than two antennas. Compensating for crosstalk can improve signal quality and enhance bandwidth or information carrying capability in a wireless communication system.

A communication signal transmitting on one antenna can couple or impose an unwanted signal, such as interference or crosstalk, onto another antenna. The antenna carrying the communication signal can be referred to as the transmitting antenna, while the antenna carrying the imposed crosstalk can be referred to as the recipient antenna. In a wireless communication system, such coupling can interfere with and degrade the performance of either or both antennas, for example limiting bandwidth or degrading signal fidelity.

In one aspect of the present invention, a cancellation device can apply a cancellation signal to the recipient antenna, which typically receives an interference signal imposed by the transmitting antenna. The cancellation signal can suppress, cancel, reduce, minimize, or negate, or otherwise compensate for, the interference signal, thereby enhancing isolation between the antennas and improving performance. The cancellation device can generate, compose, or produce the cancellation signal based on signals sampled or tapped either from the transmitting antenna or from the recipient antenna.

In another aspect of the present invention, the cancellation device can generate the cancellation signal by sampling the interference signal from the recipient antenna and processing the sample signal. Processing the sample signal can comprise adjusting the phase and the amplitude of the sample signal with a signal processing circuit to provide a cancellation signal that matches the interference signal. Adjusting the phase and amplitude of the sample signal can comprise slightly delaying in time an oscillation or cycle of the signal or slightly impeding the speed of propagation of the sample signal, for example with a variable phase adjuster. Adjusting the amplitude of the sample signal can comprise amplifying, scaling, or intensifying the sample signal, for example with a variable gain amplifier. The cancellation device can apply the cancellation signal to the recipient antenna to cancel the interference signal carried thereon. For example, the cancellation device can subtract the cancellation signal from the interference signal via a coupler that introduces the cancellation signal onto a feed line of the recipient antenna. The cancellation device can comprise a controller that dynamically controls, tunes, or adapts the phase and amplitude adjustments to refine or update the effectiveness of the interference cancellation. The cancellation device can gauge cancellation effectiveness by monitoring the level of residual or un-cancelled interference energy that exists on the recipient antenna following cancellation. The controller can use the monitored energy or power level as a feedback signal for refining the phase and amplitude adjustments. During interference cancellation, the recipient antenna can be in a dormant or passive state, for example refraining from transmitting communication signals, while the transmitting antenna is in an active state of transmitting communication signals.

In another aspect of the present invention, the cancellation device can generate a cancellation signal by sampling the communication signal on the transmitting antenna and processing that sample signal. Processing the sample signal can comprise feeding the sample signal into a model of the interference effect. The model can generate and output the cancellation signal as an estimate or emulation of the interference signal. The cancellation device can cancel a substantial portion of the interference by applying the cancellation signal to the recipient antenna, for example, by subtracting the cancellation signal from the signals that the recipient antenna carries. The cancellation device can comprise a controller that dynamically adjusts or adapts the model to refine the cancellation signal, thereby increasing cancellation effectiveness or maintaining cancellation effectiveness in a dynamic operating environment. The controller can monitor residual interference energy on the recipient antenna and adjust the model to minimize the monitored energy. The cancellation device can inject test signals into the antenna system and monitor the interference that these test signals produce. The controller can analyze interference stimulated by the test signals and refine the model based on the analysis.

The discussion of canceling or correcting interference presented in this summary is for illustrative purposes only. Various aspects of the present invention may be more clearly understood and appreciated from a review of the following detailed description of the disclosed embodiments and by reference to the drawings and claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

FIGS. 4A, 4B, and 4C are illustrations of simulated antenna field patterns for a single antenna that is inherently isolated, a two-antenna system before crosstalk cancellation, and a two-antenna system after crosstalk cancellation in accordance with an exemplary embodiment of the present invention.

DETAILED DESCRIPTION OF EXEMPLARY EMBODIMENTS

The present invention supports canceling crosstalk or compensating for interference associated with two or more antennas in a wireless communication system. An exemplary method and system for crosstalk cancellation can enhance signal performance for two antennas that are disposed in close proximity to one another, for example as components in a compact wireless device, such as a portable or handheld communication device.

This invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others supported by exemplary embodiments of the present invention.

Figure 1:
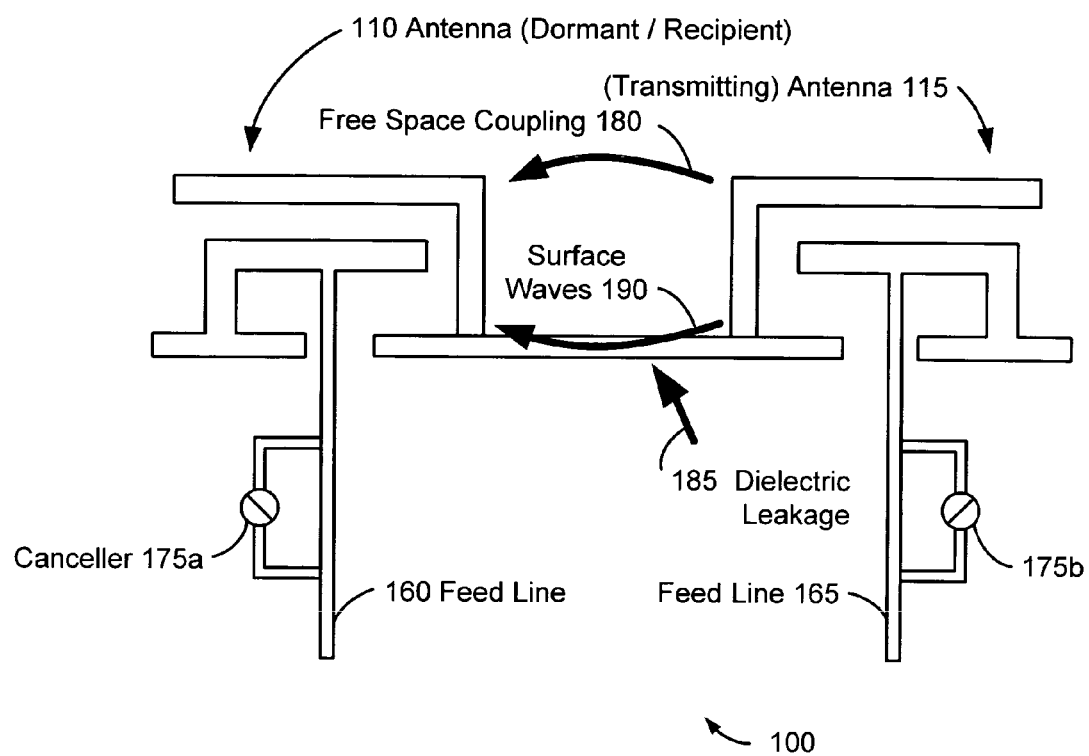
FIG. 1 is an illustration of an exemplary implementation of two crosstalk cancellers applied to two antennas in accordance with an embodiment of the present invention.

Turning now to FIG. 1, this figure illustrates an exemplary communication system 100 having two antennas 110, 115 in close proximity to one another with a crosstalk canceller 175a, 175b coupled to the feed line 160, 165 of each antenna 110, 115.

The system 100 typically operates with one of the two antennas 110, 115 dormant while the other antenna 110, 115 actively transmits a signal. The mode of each antenna 110, 115 can change during normal operation of the system. That is, one of the antennas 110, 115 can be in a passive, idle, dormant, sleep or non-transmission mode, while the other antenna 110, 115 is in a transmission mode. In the illustrated operational state, the antenna 115 is in the active mode while the antenna 110 is in the dormant mode. The antenna 115 transmits communication signals and imposes interference on the antenna 110. Thus, in the illustrated state, the antenna 115 is referred to as the transmitting antenna 115. And, the antenna 110 is referred to as the recipient antenna 110 that receives interference from the transmitting antenna 115.

The transfer or coupling of signal energy from the transmitting antenna 115 to the dormant recipient antenna 110, in the form of crosstalk interference 180, 185, 190, can impair the performance of the transmitting antenna 115. Among other detrimental effects, the unwanted transfer of radiant energy can distort the active field pattern of the transmitting antenna 115.

The canceller 175a cancels the crosstalk interference 180, 185, 190 on the dormant recipient antenna 110 that the active transmitting antenna 115 imposes on the recipient 110. While the transmitting antenna 115 is active, the canceller 175b remains passive or does not provide active cancellation.

In the opposite operational state (not shown), antenna 115 is dormant and antenna 110 is active. In this state, canceller 175b cancels interference that antenna 110 imposes on antenna 115, and canceller 175a is passive.

If both antennas 110, 115 are in an active state, then both cancellers 175a, 175b are typically off or in a passive mode. Both antennas 110, 115 may be simultaneously transmitting a common payload to enhance the overall gain of the system 100, for example. Thus, the cancellation configuration of the system 100 can provide interference cancellation in diversity antenna systems wherein one or more antennas are transmitting during a time period that at least one other system antenna is dormant, passive, or in a non-transmitting state. A compact communication device, such as a cell phone, GPS, radio, walkie-talkie, portable computing device, laptop computer, palmtop computing system, etc., can comprise the system 100. Such a communication device can further comprise a duplexer and an associated power amplifier ("PA"), transmitter electronics, and receiver electronics (not shown) coupled to the antenna feed lines 165, 160.

The cancellers 175a, 175b can reduce or cancel various forms of interference or crosstalk 180, 185, 190 that can impair operation of the system's antennas 110, 115 and compromise signal fidelity. Exemplary forms of such crosstalk or interference can include surface waves 190, free space coupling 180, and dielectric leakage 185. Such crosstalk 180, 185, 190 can occur in either or both directions during operation of the system 100. Thus, each of the antennas 110, 115 can be an interference generator and an interference recipient. That is, each of the two antennas 110, 115 can be both a crosstalk "aggressor" and a crosstalk "victim." For example, the transmitting antenna 115 can impose an interference signal on the dormant recipient antenna 110. The dormant antenna 110 may radiate the imposed interference back to the transmitting antenna 115, for example as a standing wave, in a manner that interferes with the field pattern of the transmitting antenna 115.

Surface waves 190, which are typically electromagnetic signals, can propagate along the surface of a dielectric material from the transmitting antenna 115 to the dormant recipient antenna 110. For example, each of the antennas 110, 115 can be mounted on a circuit board substrate wherein the feed lines 160, 165 pass through a via or through-hole of the circuit board. The surface waves 190 can propagate on the surface of the circuit board, which typically comprises dielectric material such as resin or ceramic. This unwanted transfer of energy can negatively impact the signal performance of the system 100. The canceller 175a can cancel such surface wave crosstalk or interference 190.

Free space coupling 180 is the coupling of RF electromagnetic signals in the free space medium of open air between the antennas 110, 115. The dormant antenna 110 can draw RF energy from the transmitting antenna 115. The presence of the dormant antenna 110 in the vicinity of the transmitting antenna 115 can undesirably distort the electromagnetic field pattern of the transmitting antenna 115. Such crosstalk or interference can negatively impact the transmitting antenna's performance if left unchecked. The canceller 175a can enhance antenna isolation by canceling interference due to free space coupling 180.

Dielectric leakage crosstalk or interference 185 can also compromise signal integrity of the antennas 110, 115. Dielectric leakage 185 can occur when an imperfect insulator, such as a flawed dielectric material, allows bleed-through of RF electromagnetic signals. A portion of the bleed-through RF signal may find a path to the dormant antennas 110, 115 and interfere with the antenna's intended signals. The canceller 175a can cancel dielectric leakage crosstalk or interference 185.

The system's cancellers 175a, 175b can address and cancel crosstalk or interference resulting from one or more phenomena, such as surface wave coupling 190, free space coupling 180, and dielectric leakage 185 (a non-exhaustive list). Each antenna 110, 115 has a canceller 175a, 175b coupled to its respective feed line 160, 165. As discussed above, each of the cancellers 175a, 175b provides active cancellation during time periods that the antenna 110, 115 to which it is connected is dormant and the other antenna 110, 115 is active. By canceling the crosstalk interference effects 180, 185, 190, these cancellers 175a, 175b improve the level of isolation between the antennas 110, 115. Decoupling the respective signals of the antennas 110, 115 provides improved integrity of the transmitted communication signals and improved antenna radiation patterns. Such improvements enhance efficiency, directivity, beam shape, throughput, and reach.

Each canceller 175a, 175b taps off or samples a portion of the interfering signal on its respective feed line 160, 165 as a reference signal. Based on this reference signal, each canceller 175a, 175b generates a cancellation signal that is applied to its respective feed line 160, 165. Thus, when the antenna 110 is dormant and the antenna 115 is actively transmitting communication signals (as illustrated), canceller 175a samples the interference on the feed line 160 and uses the sampled signal as a reference signal. Based on processing of this reference signal, the canceller 175a generates a cancellation signal and applies that cancellation signal to the feed line 160.

The application of the cancellation signal by canceller 175a to feed line 160 cancels or reduces the interference signals that the transmitting antenna 115 may otherwise impose on the dormant antenna 110. The canceller 175a adjusts the magnitude, phase, and timing of the generated cancellation signal to cancel the interfering signal on the feed line 160. That is, the canceller 175a samples the interfering signals or waveforms on the feed line 160 and composes a cancellation signal having suitable magnitude, phase, and timing characteristics that negate, cancel, or destructively interfere with the crosstalk interference on the antenna 110.

Figure 2:
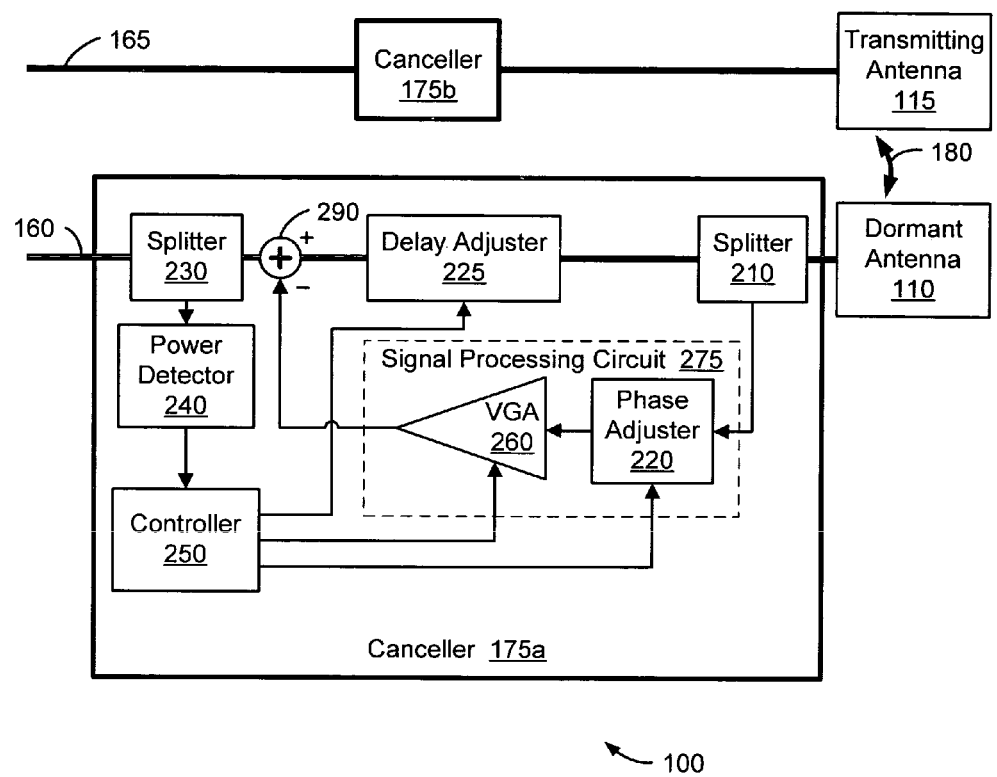
FIG. 2 is a functional block diagram of an exemplary crosstalk canceller in a wireless communication system in accordance with an embodiment of the present invention.

Turning now to FIG. 2, this figure illustrates a functional block diagram of an exemplary crosstalk canceller 175a in a wireless communication system 100. The system 100, which can be the system 100 illustrated in FIG. 1, comprises two cancellers 175a, 175b, each coupled to the feed line 160, 165 of its respective antenna 110, 115. While both cancellers 175a, 175b typically comprise the same functional components, for clarity of explanation, FIG. 2 illustrates an exemplary functional block diagram of the canceller 175a but not of the canceller 175b. Thus, the two cancellers 175a, 175b can be two copies of a standardized module.

It will be appreciated by those skilled in the art that the division of the system 100 and the crosstalk canceller 175a into functional blocks, modules, and respective sub-modules as illustrated in FIG. 2 (and similarly the system 700 illustrated in FIG. 8 and discussed below) are conceptual and do not necessarily indicate hard boundaries of functionality or physical groupings of components. Rather, representation of the exemplary embodiments as illustrations based on functional block diagrams facilitates describing an exemplary embodiment of the present invention. In practice, these modules may be combined, divided, and otherwise repartitioned into other modules without deviating from the scope and spirit of the present invention.

The canceller 175a comprises a phase adjuster 220, a delay adjuster 225, a variable gain amplifier ("VGA") 260, two splitters 210, 230, a subtraction node 290, a power detector 240, and a controller 250. The splitter 210 samples the interfering signal exciting the otherwise-passive dormant antenna 110. A signal processing circuit 275, comprising the phase adjuster 220 and the VGA 260, processes the sample signal or reference by respectively adjusting sample signal's phase and amplitude. The summation node 290 applies the phase-shifted and amplitude-adjusted signal that is output by the signal processing circuit 275 to the feed line 160 of the dormant antenna 110, thereby canceling the interference. The delay adjuster 225 times the cancellation signal and the interference signal for coincidence at the dormant antenna 110. The splitter 230 samples the signal on the feed line 160 resulting from applying cancellation to the crosstalk. The power detector 240 measures the power level of this residual, un-canceled signal and provides the resulting measurement to the controller 250 as a feedback control signal. Based on this energy or power measurement, the controller 250 dynamically adjusts or tunes the VGA 260, the delay adjuster 225, and the phase adjuster 220 to refine the cancellation of interference. The illustrated functional blocks of the canceller 175a will now be discussed individually in further detail.

The splitter 210, the splitter 230, and the summation junction 290 can each comprise a coupler. The term "coupler," as used herein, refers to a device that couples electrical or electromagnetic signals into or out of a signal channel. The exemplary couplers 210, 230, 290 of the system 100 comprise three ports. Two of the ports connect to transmission line 160, while the third port passes the signals that the coupler 210, 230, 290 introduces onto or extracts from the transmission line 160. As will be discussed in further detail below, the canceller's couplers 210, 230, 290 extract sample and feedback signals from the feed lines 160, 165 and introduce cancellation signals onto the feed lines 160, 165.

The splitter 210 that is adjacent to the dormant antenna 110 samples the interference signals coupled onto this antenna 110 from the adjacent transmitting antenna 115 via free space coupling 180 or other crosstalk effect. That is, the splitter 210 taps off a portion of the signal energy that transfers from the radiant antenna 115 to the passive recipient antenna 110 as a result of the close proximity of these two antennas 110, 115. Thus, the splitter 210 acquires a reference signal representative of the interference. The canceller 175a processes this acquired reference signal, via the signal processing circuit 275 to generate a cancellation signal that, when introduced back onto the antenna feed line 160, negates the interference.

In one exemplary embodiment of the present invention the splitter 210 is a passive directional coupler. In an alternative embodiment of the present invention, the splitter 210 can comprise an active circuit. The splitter 210 typically exhibits relatively high input impedance at the tap-off point. For example, the splitter 210 can provide 50 ohms of impendence to match the impedance characteristics of the other discreet components of the canceller 175a. That is, the components of the canceller 175a can be impedance matched at 50 ohms or another suitable impedance characteristic value.

The impedance characteristics of the splitter 210 support operating the antenna 110 in either the dormant or active mode. At the tap-off, the splitter 210 should have a high impedance to avoid affecting the feed through line characteristic impedance. When the antenna 110 is in the active mode of purposely transmitting signals (opposite the illustrated operating state), the canceller 175a is in a passive or off mode, typically without producing cancellation signals. To support antenna operation when the canceller 175a is in such a passive mode, the splitter 210 preferably introduces minimal or essentially no loss into the signal path of the antenna feed line 160. That is, the splitter 210 avoids contributing excessive loss to the signal path that could encumber active performance of the antenna 110. Excessive loss in the signal path of the feed line 160 can impair transmitted or received signals and cause degradation in receiver sensitivity.

To further support operating the antenna 110 in both an active and a passive mode, the splitter 210, the splitter 230, the summation node 290 and the delay adjuster 225, as well as any other components in signal path of the feed line 160, are bidirectional.

In one exemplary embodiment of the present invention, the signal path of the feed line 160 comprises loss compensation to compensate for any components in the signal path that introduce loss. Increasing the gain of the PA or a low noise amplifier ("LNA") can provide loss compensation. A gain block usually cannot be introduced between the antenna 110 and the duplexer because most gain blocks are unidirectional devices and therefore affect the bi-directionality of the system.

In one exemplary embodiment, canceller 175a is introduced between the PA and the duplexer. In this arrangement, the LNA path remains untouched and will not suffer from the loss hit of the canceller 175a. However, a gain block may need to be introduced at the PA side before the canceller system 175a.

In another exemplary embodiment, the canceller system 175a has a bypass mode. When the canceller 175a is off, the signal going through the feed line 160 bypasses the canceller 175a via the bypass mode. Using a bypass configuration is typically the preferred approach to address loss issues, as the bypass circumvents any need to improve the gain of the PA and the LNA.

Referring now to the illustrated operational mode, the phase adjuster 220 receives the sampled signal from the splitter 210 and adjusts the phase to provide a phase match at the summation node 290 between the phase of the interference signal propagating on the transmit/receive signal path of the feed line 160 and the cancellation signal. That is, the phase adjuster 220 provides phase synchronization or alignment between the cancellation signal that is applied to the feed line 160 and the interference that is on the feed line 160.

In one exemplary embodiment, the phase adjuster 220 adjusts the phase of the cancellation signal so that the cancellation signal is 180° out of phase with the interference at the point of application, which can comprise a summation node 290. If the cancellation signal is in phase with the interference, the summation node 290 subtracts the cancellation signal from the interference (as illustrated). On the other hand, if the cancellation signal is 180° out of phase with respect to the interference, the summation node 290 adds these signals to one another.

In one exemplary embodiment of this invention the phase shifter 220 comprises quadrature hybrids and four silicon hyper-abrupt junction varactor diodes, supported by typical resistors, inductors, and capacitors. In one embodiment, the phase shifter 220 comprises an active circuit.

The VGA 260 receives the phase shifted or matched cancellation signal from the phase adjuster 220 and matches the signal's amplitude to the interference signal propagating on the feed line 160 of the dormant antenna 110 at the summation node 290. That is, the VGA 260 amplifies the cancellation signal to provide an amplitude or magnitude that matches the interference on the feed line 160.

The summation node 290, which applies the cancellation signal to the feed line 160, can be a passive directional coupler or an active circuit. As discussed above regarding the splitter 210, the summation node 290 should not introduce significant impedance mismatch to the transmit/receive path of the antenna feed line 160.

The controllable delay adjuster 225 matches the group delay of the interference signal propagating through the path of the feed line 160 to the group delay of the cancellation signal that propagates through the path of the signal processing circuit 275. That is, the delay adjuster 225, which may also be referred to as an adjustable delay, compensates for the signal delay that occurs between the splitter 210 and the summation node 290 along the feed line path relative to the signal delay that occurs between the splitter 210 and the summation node 290 in the signal processing circuit 275.

The splitter 230 samples the cancelled signal and feeds it to the power detector 240. That is, the splitter 230 provides a sample of the residual signals on the feed line 160 that result from applying the cancellation signal to the interference at the node 290. If the cancellation is effective, the residual signals have less power or energy than if the cancellation is ineffective. The power detector 240 monitors this cancelled signal and feeds the monitored power to the controller 250 as a feedback signal that provides an indication of cancellation effectiveness. The controller 250 adapts and controls the VGA 260, the phase adjuster 220, and the delay adjuster 225 according to the feedback to provide a cancellation signal that adequately cancels or negates crosstalk interference on the feed line 160 and the antenna 110.

More specifically, the controller 250 learns the values of the phase, the delay, and the gain that provide minimal energy on the feed line 160. The phase, the delay, and the gain are adjusted to empirically reduce the amount of interference to a predetermined or minimal level. Phase or delay misalignments and magnitude mismatches can adversely affect the improvements in the overall transmitted signal quality on the transmitting antenna 115. That is, the controller 250 manipulates the VGA 260, the delay adjuster 225, and the phase adjuster 220 to identify operating points for each of these devices that minimize the signal power on the feed line 160 during time periods that the antenna 110 is dormant and should not be transmitting RF energy. Minimizing signal power of the dormant antenna 110 and its feed line 160 minimizes the perturbation that this antenna 110 causes on the transmitting antenna 115, which is purposely handling communication signals.

The controller 250 comprises logical elements, such as hardwired, fixed, or programmable logic. The controller 250 usually comprises a microcontroller, microprocessor, microcomputer, or other computing processor, such as an application specific integrated circuit ("ASIC"). In addition to such logical elements, the controller can comprise supporting circuitry, interface electronics, power supplies, and memory, for example.

Commonly owned U.S. Nonprovisional patent application Ser. No. 10/108,598, entitled "Method and System for Decoding Multilevel Signals" and filed on Mar. 28, 2002, discloses a viable exemplary system and method for assessing signals. Commonly owned U.S. Nonprovisional patent application Ser. No. 10/620,477, entitled "Adaptive Noise Filtering and Equalization for Optimal High Speed Multilevel Signal Decoding" and filed on Jul. 15, 2003, discloses a viable exemplary system and method for controlling device parameters of the phase adjuster 220, the VGA 260, and the delay adjuster 225. The disclosures of U.S. patent application Ser. No. 10/108,598 and U.S. patent application Ser. No. 10/620,477 are hereby fully incorporated by reference. One or more of the phase adjuster 220, the VGA 260, and the delay adjuster 225 can each be controlled and/or adjusted using a method and/or system disclosed in U.S. patent application Ser. No. 10/108,598 or U.S. patent application Ser. No. 10/620,477. The parameters of these devices 220, 260, 225 can be determined by treating each device parameter as a variable that is swept through its range of potential values following the disclosure of these patent applications, for example.

Figure 3A:
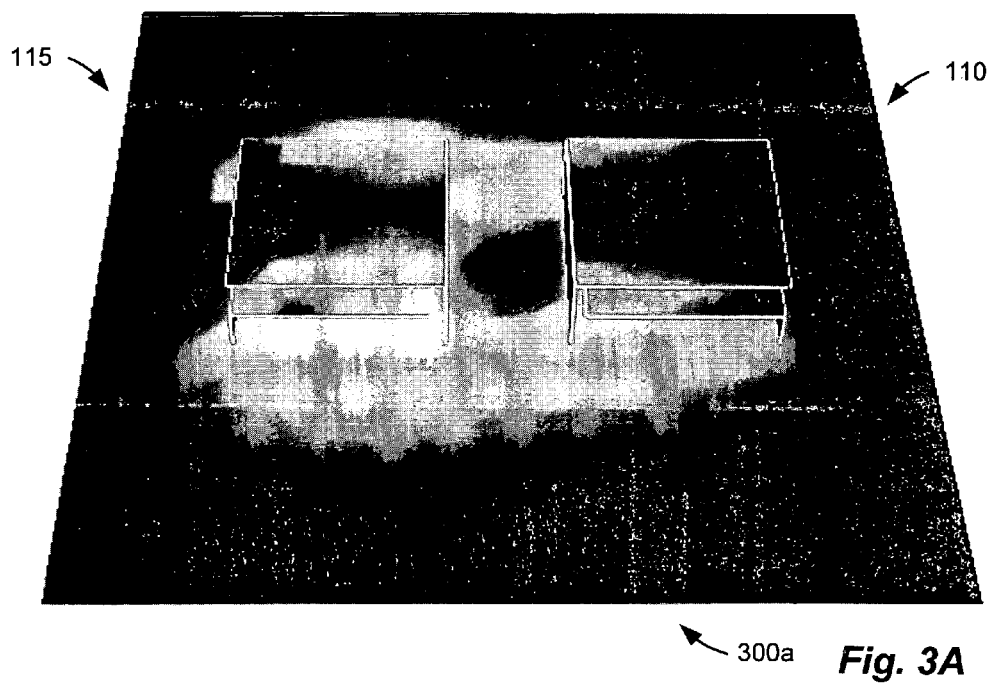
FIGS. 3A and 3B are illustrations of exemplary simulation results for a two-antenna system before and after crosstalk cancellation in accordance with an embodiment of the present invention.
Figure 3B:
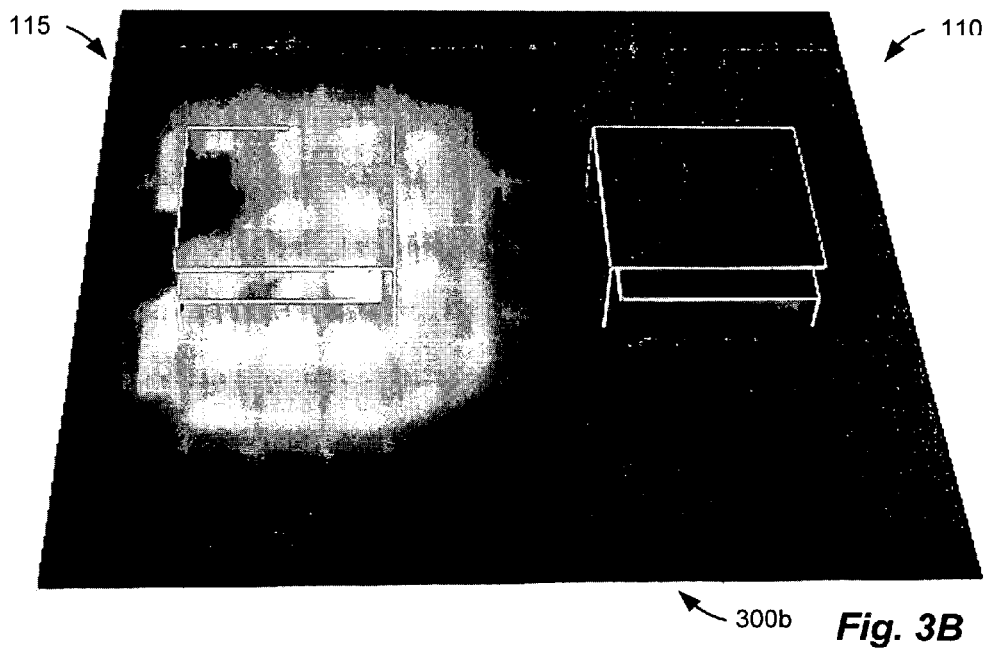

Turning now to FIGS. 3A and 3B, these figures illustrate a simulation of an antenna system 300 before and after canceling crosstalk interference according to an exemplary embodiment of the present invention. More specifically, these figures show the reduction in electromagnetic coupling between two antennas 110, 115 achieved by canceling the interfering transmitting signal occurring on a dormant or non-transmitting antenna 110 that is an interference recipient and carrier of an interference signal.

The intensity of the white pattern on the black background shows the simulated surface current distribution for a pair of compact folded-dipole antennas 110, 115 spatially separated by $\lambda/10$ (0.1 lambda). In one exemplary embodiment, the antennas 110, 115 illustrated in FIGS. 1 and 2 can be the compact folded-dipoles of FIGS. 3A and 3B and will be referred to as such with reference to FIGS. 3A, 3B, 4A, and 4B.

FIG. 3A illustrates the surface current distribution with the system 300a operating in an uncompensated state. The unconfined surface current shows crosstalk coupling between the antennas 110, 115 associated with a lack of antenna isolation. The transmitting antenna 115 excites the dormant antenna 110 causing spreading or dispersion of surface current between the two antennas 110, 115.

FIG. 3B illustrates the simulated result of applying crosstalk cancellation via the canceller 175a as shown in FIGS. 1 and 2 and discussed above. That is, the canceller 175a applies crosstalk cancellation to the dormant antenna 110 thereby improving performance of the transmitting antenna 115. As demonstrated by the minimal or near-zero current distribution on the dormant antenna 110, the canceller 175a reduces the unintended coupling between the antennas 110, 115 to a value that can approach zero. In other words, the confinement of the surface current to the active antenna 115 correlates to improved isolation of this antenna 115.

Turning now to FIGS. 4A, 4B, and 4C, these figures respectively illustrate simulated antenna field patterns 425, 450, 475 for a single antenna 115 that is inherently isolated, a two-antenna system before crosstalk cancellation 300a, and a two-antenna system after crosstalk cancellation 300b in accordance with an exemplary embodiment of the present invention. Each of the figures presents its respective field pattern 425, 450, 475 as a three-dimensional plot. As will be understood by those skilled in the art, the plots 425, 450, 475 graphically represent electromagnetic field patterns and convey information in an intuitive manner. Thus, these plots 425, 450, 475 complement the current density illustrations 300a, 300b of FIGS. 3A and 3B discussed above and illustrate the beneficial results that the crosstalk canceller 175a can provide.

The plot 425 of FIG. 4A presents simulated data from a single folded-dipole antenna 115 that is not subject to interference from another antenna 110. Specifically, the illustrated field pattern 425 is an output of a simulation of operating the transmitting antenna 115 shown in FIGS. 3A and 3B without the presence of the adjacent dormant antenna 110. The field pattern 425 derived from operating this antenna 115 in a fully isolated state provides a standard for evaluating the results of applying a crosstalk canceller 175a to an interfering pair of antennas 300a. That is, the simulated single antenna 115 is inherently isolated from interference. The directivity of the antenna's radiation pattern 425 is 4.9 dBi.

As will be appreciated by those skilled in the art, directivity is a measure of the focus of an antenna coverage pattern in a given direction. A theoretical loss-less antenna element, referred to as an isotropic element, has 0.0 dBi directive gain distributed in all three dimensions. That is, an isotropic antenna is a theoretical point source that radiates power equally in all directions, resulting in a perfect spherical pattern.

In order to achieve higher directive gain in a direction of interest, most antennas focus or concentrate the antenna's field pattern in a specific direction, such as towards a receiver, thereby maximizing energy transfer. For example, most patch antennas have a beam pattern that is directed in a single direction to project a substantial portion of the energy perpendicular to the application plane.

The unit "dBi" refers to a decibel ("dB") representation of the ratio between a given antenna's power and the corresponding power of an isotropic antenna's power, wherein "dB" denotes ten times the base-ten logarithm of the ratio. Higher dBi values correspond to higher gain and thus more focus coverage. For example, an antenna that has 10 dB of gain in a specific direction provides ten-fold more gain in that specific direction than would an isotropic antenna.

FIG. 4B shows the simulated pattern for a two antenna system 300a where the second antenna 110 is dormant and placed $\lambda/10$ away from the transmitting antenna 115 as illustrated in FIG. 3A and discussed above. The transmitting antenna 115 exhibits a radiation pattern with a directivity of 3.9 dBi. Thus, the presence of the second interfering antenna 115 reduces the maximum gain of the pattern from 4.9 dBi to 3.9 dBi.

FIG. 4C shows the simulated pattern for the two antenna system 300b of FIG. 3B resulting from applying crosstalk cancellation to the dormant antenna 110 via the crosstalk canceller 175a as illustrated in FIG. 3B and discussed above. With the crosstalk canceller 175a active, the antenna 115 outputs a radiation pattern with a directivity of 4.7 dBi.

Whereas the antenna pattern 450 of the active antenna 115 in the presence of the uncorrected dormant antenna 110 exhibits reduced focus and distortion as compared to the single-antenna field pattern 425, the corrected field pattern 475 resembles the single-antenna field pattern 425. That is, the interference canceller 175a redirects and reshapes the transmitted beam of an active antenna 115 to achieve isolation and to meet a specified result, for example. The canceller 175a further restores the gain directivity to a value that is within 0.2 dBi of the directivity of a single antenna 115 that is inherently isolated. Thus, the simulated cancellation largely removes the interference that an active antenna 115 imposes on an adjacent dormant antenna 110.

The beam restoration provided by the canceller 175a can yield a gain improvement of 3 to 4 dB for an antenna 115 in a design direction of maximum radiation. The systemic effect of these improvements can achieve a four-fold to five-fold improvement in transmission distance, a 40% reduction in required antenna power, and a ten-fold improvement in bit error rate ("BER"), for example.

Figure 5A:
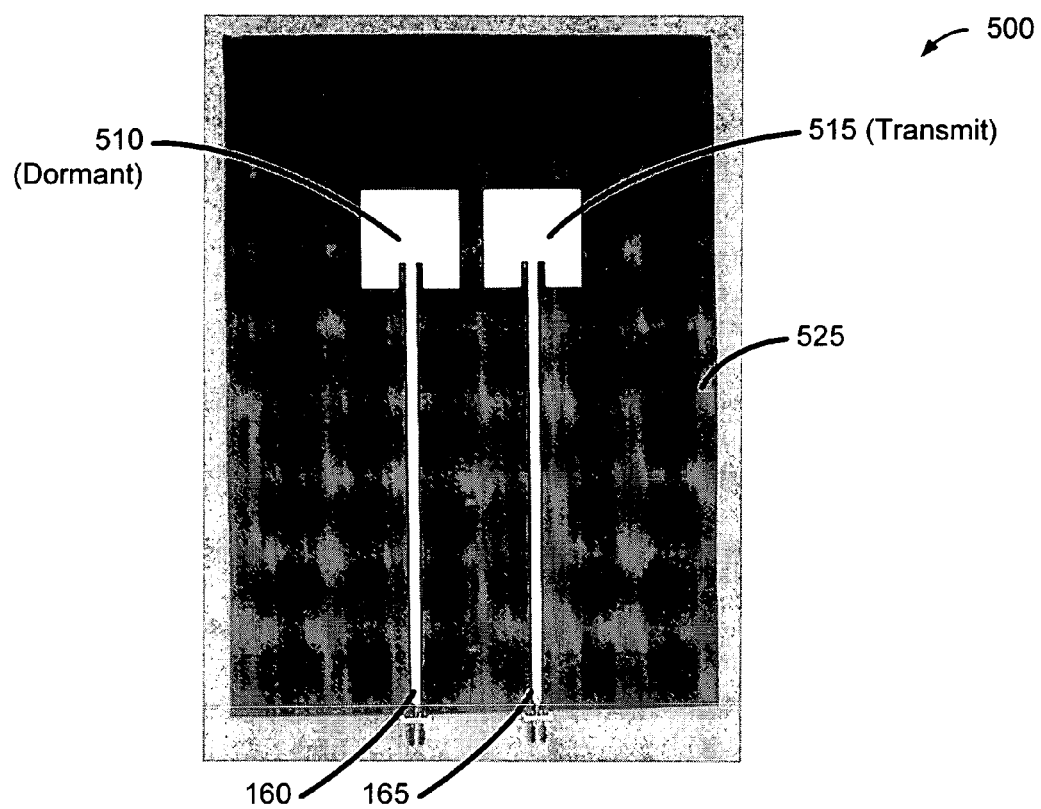
FIG. 5A is an illustration of an exemplary system comprising two patch antennas in accordance with an embodiment of the present invention.

Turning now to FIG. 5A, this figure illustrates an exemplary system 500 comprising two patch antennas 510, 515 in accordance with an exemplary embodiment of the present invention. These antennas 510, 515 were fabricated on a substrate of FR4 material, which is a synthetic material commonly used for circuit boards. Versions of the antenna system 500 were fabricated with spacing between the individual antennas 510, 515 of $\lambda/10$, $\lambda/8$, $\lambda/6$, $\lambda/4$, and $\lambda/2$. That is, the physical distance between the patch antennas 510, 515 for each of five fabricated systems 500 was, respectively, one tenth, one eighth, one sixth, and one half of the wavelength, lambda, of the transmitted communication signal. While either of the antenna 510, 515 may be in a dormant or active state, the antenna 515 will be arbitrarily referred to as the transmitting antenna while the antenna 510 will be arbitrarily referred to as the dormant antenna.

Figure 5B:
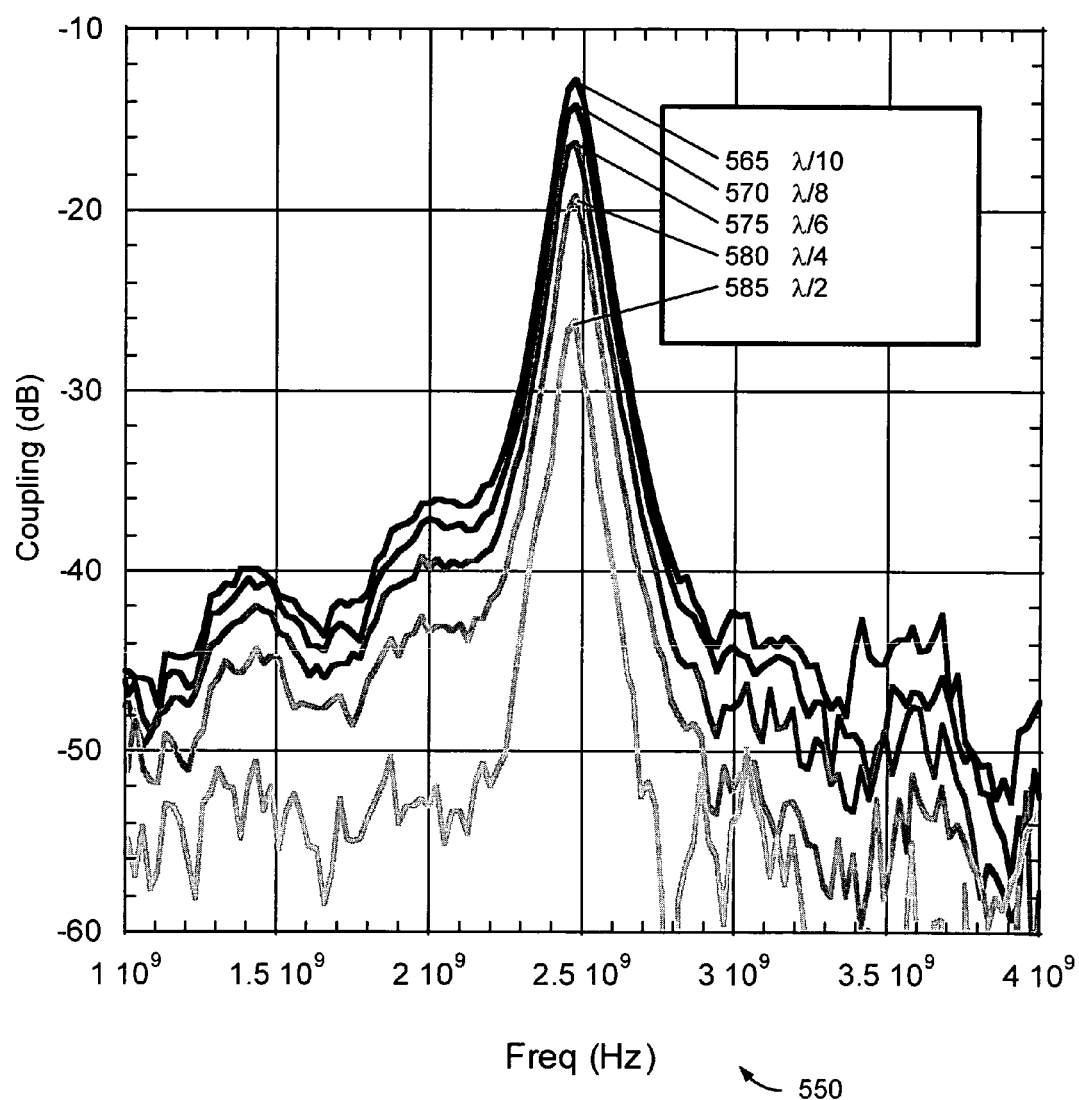
FIG. 5B is a graph of representative signal plots for the patch antenna system prior to interference cancellation in accordance with an embodiment of the present invention.

Turning now to FIG. 5B, this figure illustrates a graph of representative signal plots 565, 570, 575, 580, 585 for the patch antenna system 500 prior to interference cancellation in accordance with an exemplary embodiment of the present invention. In laboratory testing of each of the five antenna systems 500, one patch antenna 515 transmitted excitation signals of varying frequency. At the same time, an instrument monitored the power coupled into the other patch antenna 510 as a function of frequency. Thus, the plot 550 illustrates the relative coupling between the two antennas 510, 515 for frequencies between 1 gigahertz ("GHz") and 4 GHz ($1 \times 10^9$ Hz to $4 \times 10^9$ Hz).

All of the signal plots 565, 570, 575, 580, 585 have a peak at approximately 2.4 GHz, indicating that crosstalk coupling is strongest for this frequency. The trend in the family of curves 565, 570, 575, 580, 585 shows that the crosstalk interference effect increases with decreasing spatial separation between the antennas 510, 515. The coupling for the different spaced antennas pairs 500 varies from −15 to −28 dB at 2.4 GHz. That is, the coupling plots 585, 580, 575, 570, 565 for each of the antenna pairs 500 that have respective antenna-to-antenna separations of $\lambda/2$, $\lambda/4$, $\lambda/6$, $\lambda/8$, and $\lambda/10$, progressively intensifies as the separation between the antennas 510, 515 lessens. The test data shows that the coupling is strongest for the $\lambda/10$-spaced patch antennas 510, 515.

In one exemplary embodiment of the present invention, the patch antenna pair 500 operates in a WiFi application or complies with the standards provided by the Institute of Electronic and Electrical Engineers ("IEEE") under the designation IEEE 802.11 or specifically the coding protocols that paragraphs b or g of this specification provide. The IEEE 802.11b standard describes enhancements to IEEE 802.11 to support data rates of 5.5 and 11 Megabits per second. The IEEE 802.11g standard describes protocols for wireless communication with 54 Megabits per second of data at 2.4 GHz.

Figure 6A:
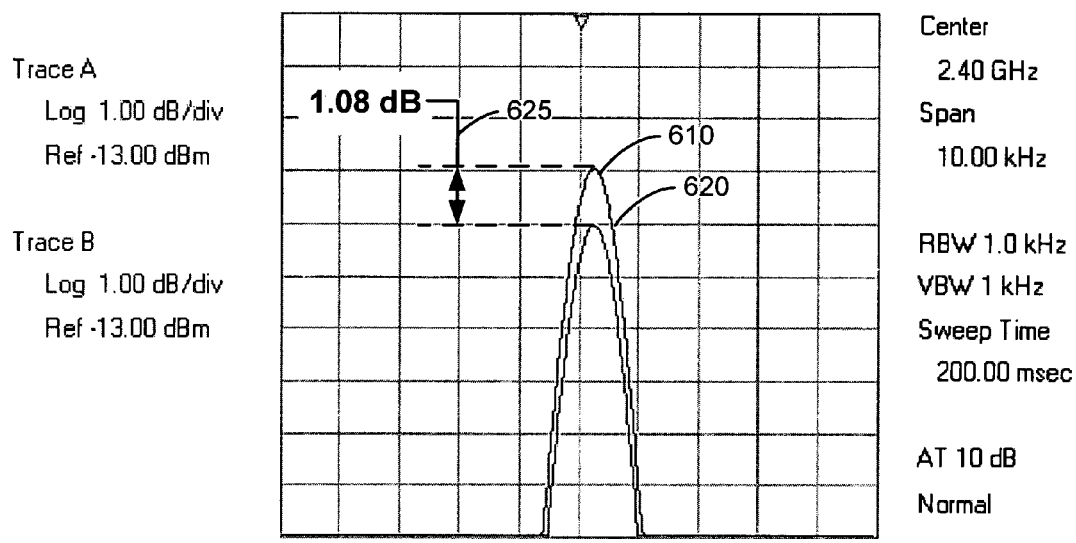
FIGS. 6A and 6B are representative signal plots for a pair of patch antennas before after interference cancellation in accordance with an embodiment of the present invention.
Figure 6B:
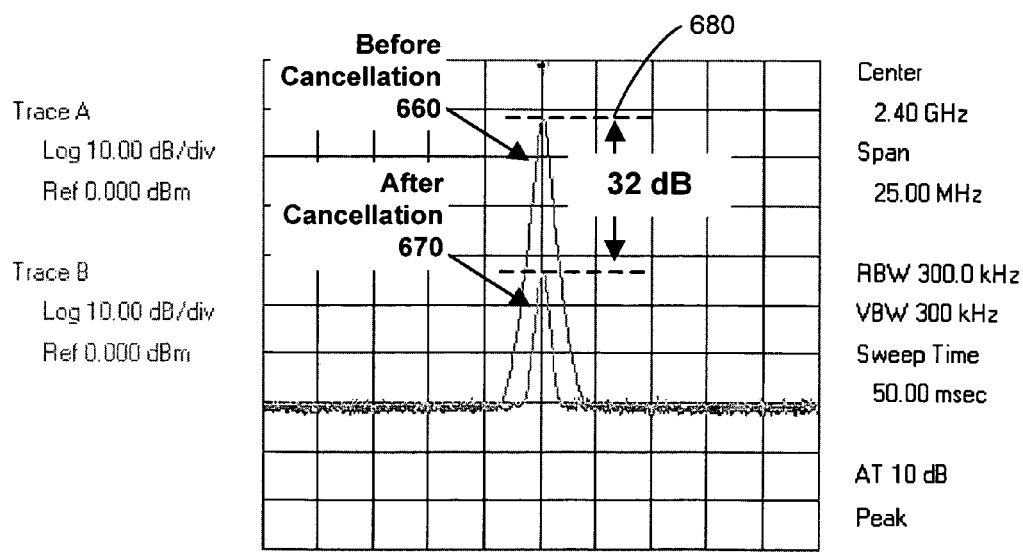

FIGS. 6A and 6B illustrate signal plots 600, 650 for a pair 500 of patch antennas 510, 515 before and after interference cancellation in accordance with an exemplary embodiment of the present invention. The plots 600, 650 present laboratory test data for the patch antenna pair 500 illustrated in FIG. 5A and discussed above.

The plot 600 of FIG. 6A shows two transmit power spectra 610, 620 for the $\lambda/10$-spaced patch antenna pair 500. The trace 620 presents test data acquired prior to applying interference cancellation. In contrast, the trace 610 presents test data acquired while applying interference cancellation according to an exemplary embodiment of the present invention. Specifically, the test conditions included an application of interference cancellation that was in keeping with the cancellation provided by the exemplary canceller 175a discussed above with reference to FIGS. 1–4.

A fixed level of input power fed the transmit patch antenna 515. The patch antenna 510 was dormant during the tests and interfered with the function of the active antenna 515. Trace 620 presents the antenna's transmitted power without interference cancellation. In contrast, trace 610 presents the antenna's transmitted power during interference cancellation. The difference 625 between the two test traces 610, 620 is approximately 1.08 dB. That is, under laboratory test conditions, the interference canceller 175a provided an improvement in antenna gain of approximately 1.08 dB. Thus, crosstalk cancellation provides the antenna system 500 with a measured improvement in transmitted power.

The plot 650 of FIG. 6B shows measured data of the electromagnetic signal on the dormant antenna 510 before and after crosstalk cancellation. The trace 660 was generated by measuring the signal on the dormant antenna 510 without interference cancellation while the active antenna 515 transmitted RF communication signals by radiating an electromagnetic field. Conversely, the trace 670 shows the signal captured from the dormant antenna 510 while the active antenna 515 output a signal and the canceller 175a suppressed interference. The difference 680 between these two traces 660, 670 shows that the canceller 175a provided a 32 dB improvement in antenna isolation. That is, the application of crosstalk cancellation significantly reduced undesirable power transfer from the transmitting antenna 515 to the dormant antenna 510.

Figure 7:
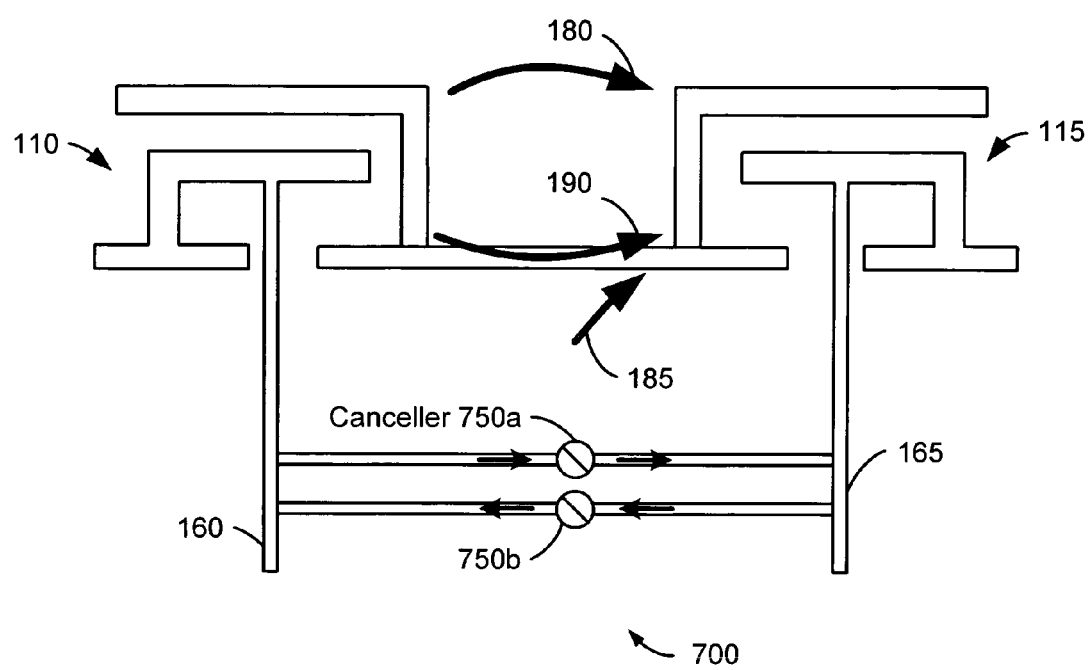
FIG. 7 is an illustration of an exemplary implementation of a system comprising two crosstalk cancellers coupled in a parallel arrangement between two antennas in accordance with an embodiment of the present invention.

Turning now to FIG. 7, this figure illustrates an exemplary implementation of a system 700 comprising two crosstalk cancellers 750a, 750b coupled in a parallel arrangement between two antennas 110, 115 in accordance with an embodiment of the present invention. The system 700 of FIG. 7 and the system 100 illustrated in FIG. 1 and discussed above can comprise the same antennas 110, 115 and antenna feed lines 160, 165 and can receive communication impairment from the same forms of crosstalk interference 180, 185, 190. However, the operational modes and cancellers 175, 750 of these systems 100, 700 can be distinct.

Referring to FIG. 7, the cancellers 750a, 750b can address interference in diversity antenna systems as well as interference on systems having antennas that transmit at different frequencies. That is, the antennas 110, 115 of the system 700 can each transmit signals at a distinct frequency. Further, the system 700 can simultaneously send signals from both antennas 110, 115 or can simultaneously receive signals from the antennas 110, 115 during crosstalk cancellation. The crosstalk cancellers 750a, 750b can provide in-band and/or out-of-band interference cancellation. The resulting crosstalk cancellation can improve receiver sensitivity and radiation pattern.

The cancellers 750a, 750b connect between the antennas 110, 115 in a parallel arrangement. Canceller 750a applies crosstalk cancellation to the antenna 115 via the feed line 165, while canceller 750b provides cancellation to the antenna 110 via the feed line 160. The resulting canceller arrangement provides bi-directionality for each of the antennas 110, 115. In this arrangement, both cancellers 750a, 750b can concurrently cancel interference at the same time that both antennas 110, 115 are actively transmitting signals. Thus, each of the antennas 110, 115 can be a recipient antenna and a transmitting antenna at the same time.

Canceller 750a taps a reference signal off the feed line 160 of the antenna 110 and processes this reference signal to generate a cancellation signal that it applies to the feed line 165 of the antenna 115. The application of the cancellation signal to the recipient antenna 115 cancels or suppresses interference imposed on the recipient antenna 115 by the transmitting antenna 110.

Canceller 750b functions in a corresponding manner but in the opposite direction, tapping a reference signal from the antenna 115 and applying a generated cancellation signal to the antenna 110. In this operational direction, the antenna 115 functions as the transmitting antenna 115 and the antenna 110 functions as the recipient antenna 110.

Figure 8:
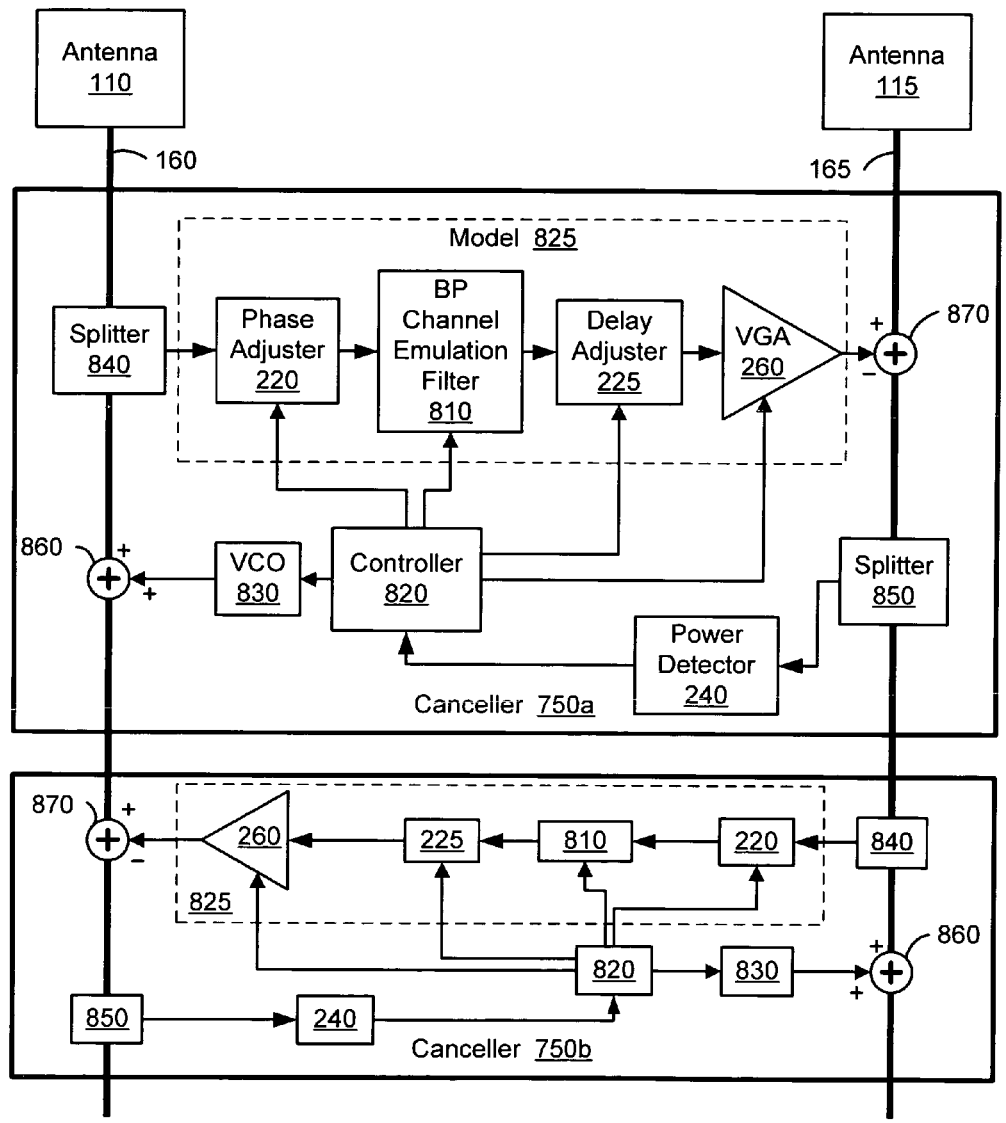
FIG. 8 is a functional block diagram of an exemplary system having crosstalk cancellers coupled between two antennas in accordance with an embodiment of the present invention.

Turning now to FIG. 8, this figure illustrates an exemplary functional block diagram of a system 700 having crosstalk cancellers 750a, 750b coupled between two antennas 110, 115 in accordance with an embodiment of the present invention. The system 700 of FIG. 8 can be the same system 700 illustrated in FIG. 7 and discussed above.

The components and layout of the crosstalk canceller 750b are transposed with respect to the crosstalk canceller 750a to support the unidirectional crosstalk cancellation of each canceller 750a, 750b. In one exemplary embodiment of the present invention, a single integrated unit comprises both cancellers 750a, 750b.

In one exemplary embodiment, both cancellers 750a, 750b have the same layout and are essentially identically. Thus, each of the cancellers 750a, 750b can be a copy of a canceller module that has pin outs for the splitters 840, 850 and the summation nodes 860, 870. In this scenario, which applies to both antennas 110, 115 operating at the same frequency, the pin outs of each canceller module can be connected to the appropriate antenna feed lines 160, 165 to provide the system architecture shown in FIG. 8. However, if each antenna 110, 115 operates at a distinct frequency, each canceller 750a, 750b has a unique emulation filter 810 corresponding to the frequency of operation of the respective antenna 110, 115.

In one exemplary embodiment of the present invention, the system 700 comprises transmitter and receiver electronics (not shown) coupled to each of the antenna feed lines 160, 165. Each antenna 110, 115 can be a transceiver antenna that both sends and receives wireless signals. A duplexer (not shown) can separate ingoing and outgoing signals for direction to the appropriate circuit paths. The duplexer can direct incoming signals from antenna 110 to the receiver and can direct outgoing signals from the transmitter to the antenna 110, for example. PAs (not shown) can amplify outgoing signals that radiate from each antenna 110, 115. A PA is not disposed between the duplexer and its associated antenna 110, 115, as the signal path spanning between the duplexer and the antenna 110, 115 is bidirectional, whereas the PA handles signals in a single direction. Rather, the PA is on the transmitter side of the duplexer, opposite the antenna. In other words, components that are not bidirectional, such as PAs, typically are not disposed between a duplexer and its respective antenna 110, 115.

The functional blocks and operation of the canceller 750a will now be described in overview fashion. The splitter 840 samples the transmitted signal on the feed line 160 of the transmitting antenna 110. The model 825 processes the sample to generate an estimate of the interference signal imposed on the recipient antenna 115 by the transmitted signal on the antenna 110. The phase adjuster 220, the delay adjuster 225, and the VGA 260 of the model 825 respectively adjust the phase, timing, and amplitude of the sampled signal to match the interference on the antenna 115 for application at the summation node 870. The emulation filter 810 models channel coupling and is tunable in order to compensate for drifts in the channel's center frequency.

The controller 820 adjusts the phase adjuster 220, the channel emulation filter 810, the delay adjuster 225, and the VGA 260 based on a feedback provided by the power detector 240. The controller 820 further controls the voltage controlled oscillator ("VCO") 830. Upon the controller's command, the VCO 830 generates pilot signals that the coupler 860 injects into feed line 160 of the antenna 110. Via the splitter 850 and power detector 240, the controller monitors the antenna-to-antenna crosstalk response to the pilot signal stimuli. The controller 820 minimizes the received pilot signal which couples via air or other interference mechanism and also undergoes processing by the signal processing circuit 825. The model 825 is adapted to cancel the pilot signals, which are out-of-band in comparison to the recipient antenna's operating frequency 115. Pilot signals may not be necessary for diversity antenna applications.

Based on the monitored response, the controller 820 dynamically refines the model 825 by adjusting the phase adjuster 220, the emulation filter 810, the delay adjuster 225, and the VGA 260. The controller 820 comprises logical elements, such as hardwired, fixed, or programmable logic. The controller 820 usually comprises a microcontroller, microprocessor, microcomputer, or other computing processor, such as an ASIC. In addition to such logical elements, the controller can comprise supporting circuitry, interface electronics, power supplies, and memory, for example.

The functional blocks of the canceller 750a will now be discussed individually. The splitter 840 obtains a sample of the transmitted signal on feed line 160 that conveys the communication signal, in the form of RF energy, to the antenna 110. The sample signal can comprise a communication signal intended to radiate from the antenna 110. The splitter 840 can be a passive directional coupler or an active circuit, as discussed above with reference to the splitter 210 of the system 100 illustrated in FIG. 2. Further, the splitter 840 can be essentially the same component as the splitter 210. The splitter 840, the splitter 850, the summation node 860, and the summation node 870 can each comprise a coupler and can also comprise three signal ports.

As discussed above with reference to the splitter 210 of FIG. 2, the splitter 840 should have impedance characteristics that match the impedance characteristics of the other components coupled to feed line 160 and should be not exhibit excessive loss characteristics. Further, the splitter 840 should have high impedance at the tap off point to avoid drawing excessive power from the feed line 160.

If loss compensation in the form of an amplifier stage or other device that is not bidirectional is introduced into the signal path, such device should be disposed on a section of the signal path that has a unidirectional signal flow corresponding to the device's directionality. Thus, loss compensation, if needed, should be applied on the transmitter/receiver side of any duplexers that the system 700 may comprise, rather than between a duplexer and its associated antenna.

In one exemplary embodiment of the present invention, the splitter 840 is disposed between the duplexer and the antenna 110. In this configuration, the canceller 750a can model any coupled interference non-linearity introduced to the system 700 by the duplexer and/or an associated PA.

Alternatively, the splitter 840 may be disposed between the duplexer and the PA, which as discussed above is on the opposite side of the duplexer with respect to the antenna 110. The splitter 840 could also be disposed before the PA. However, this configuration is not desirable for most applications as the non-linearity introduced by the PA to the system will not be modeled by the canceller 750a.

The preferred position of the summation node 870 is between the antenna 115 and the duplexer. If the summation node 870 is placed after the duplexer, i.e. between the duplexer and the LNA, then the canceller 750a will improve the receiver sensitivity but may not add sufficient contribution in improvement to the aggressing antenna signal integrity (i.e. beam shape, gain, directivity) as the other configuration. Placing the summation node 870 after the LNA typically will not yield improvement of the aggressing antenna signal integrity as the LNA is unidirectional. The improvements are on receiver sensitivity of the recipient antenna 115.

The splitter 840 provides the signal sample to the phase adjuster 220. As discussed above with reference to FIG. 2, the phase adjuster 220 adjusts the phase of the cancellation signal to match the phase of the interfering signal on the feed line 165 at point of applying the cancellation signal thereto. Also as discussed above, the phase shifter 220 can provide phase coherency if the summation node 870 is subtractive. And, the phase shifter 220 can provide a 180° phase shift if the summation node is additive.

The phase adjuster 220 outputs a signal to the emulation filter 810, which may be referred to as a band-pass ("BP") channel emulation filter. The emulation filter 810 models the channel coupling and is also tunable in order to compensate for any drifts in channel center frequency.

As shown by the shape of the plot 550 of FIG. 5B, which is discussed above, the coupling effect between two antennas 110, 115 can exhibit a defined frequency response. Aging, associated with antenna oxidation for example, may vary the center frequency and coupling of the closely spaced antennas. The rapid changes in the frequencies above and below 2.4 GHz is attributable to the noise floor or dynamic range of the measurement system. A frequency deviation, due to an environmental or aging related change can cause a variation in intensity and frequency content of the interference signal. By modeling the frequency response of the coupling effect or channel, the emulation filter 810 provides an emulated signal that is similar to the interference on the feed line 165 despite changes in the excitation signal on the source antenna 110. That is, the emulation filter 810 models the transfer function of the coupling channel in the frequency domain to provide cancellation signals having frequency dependent characteristics that match the actual interference on the antenna 115.

In one embodiment of the proposed invention, the emulation filter 810 comprises lumped elements and varactor diodes. The varactor diodes facilitate changing the center frequency of the emulation channel. In an alternative embodiment of the invention, the emulation band pass filter 810 is a Finite Impulse Filter ("FIR"), such as a tapped delay line filter. The taps and the taps spacing of such an FIR are extracted from the closely spaced antenna coupling channel characteristics. In order to achieve a high level of antenna coupling cancellation for improved signal integrity of the system 700, the emulation filter 810 should match, in trend, the coupling channel characteristics within the band of interest.

Commonly owned U.S. Nonprovisional patent application Ser. No. 10/911,915, entitled "Method and System for Crosstalk Cancellation" and filed on Aug. 5, 2004, discloses a viable exemplary tapped delay line filter system for modeling a crosstalk transfer function. In one embodiment, the tapped delay line filter comprises a plurality of delay element coupled to a plurality of variable gain amplifiers. That patent application further discloses a viable exemplary system and method for adapting a crosstalk model using a controller that monitors channel signals. The disclosure of U.S. patent application Ser. No. 10/911,915 is hereby fully incorporated by reference.

One or more of the phase adjuster 220, the VGA 260, the delay adjuster 225, and the emulation filter 810 can each be controlled and/or adjusted using a method and/or system disclosed in U.S. patent application Ser. No. 10/108,598 or U.S. patent application Ser. No. 10/620,477, discussed above with respect to FIG. 2. The parameters of these devices 220, 260, 225, 810 can be determined by treating each parameter as a variable that is swept through its range of potential values following the disclosures of these patent applications, for example.

The output of the emulation filter 810 feeds into the input of the delay adjuster 225. The delay adjuster 225 matches the group delay of the interference on the antenna 115 with the group delay of the emulated cancellation signal that is applied at summation node 870 to the feed line 165.

The VGA 260 receives the output of the delay adjuster 225 and adjusts the emulated signal's amplitude to match the amplitude of the interference signal at summation node 870. In contrast to the emulation filter's modeling of the frequency response of the crosstalk or interference channel, the VGA 260 shifts the level of the emulated signal to provide an amplitude match with the interference signal on the feed line 165. By modeling the frequency response of the crosstalk effect, the emulation filter 810 produces an emulated signal having a waveform shape that is similar to the waveform shape of the interference signal on the feed line

165. On the other hand, the VGA 260 applies gain to the emulated signal to impart it with amplitude or intensity that is substantially similar to the crosstalk interference.

The summation node 870, which can be a directional coupler or an active circuit, applies the emulated signal to the feed line 165 to cancel or negate the interference. As discussed above regarding the summation node 290 illustrated in FIG. 2, the summation node 870 should have impedance characteristics that match the impedance characteristics of the other system components and should not introduce excessive loss onto the feed line 165. The summation node 870 can be essentially the same summation node 290 of the system 100 illustrated in FIG. 2 and discussed above.

The splitter 850, which is coupled to the feed line 165 of the antenna 115, samples the cancelled signal and feeds it to the power detector 240, which monitors the power or energy of the cancelled signal associated with the cancelled pilot signals. That is, the splitter 850 and the power detector 240 gauge the level of any residual or post-cancellation interference that remains on the antenna 115. The controller 820 uses this monitored signal as feedback for adjusting the phase adjuster 220, the emulation filter 810, the delay adjuster 225, and the VGA 260.

Under control of the controller, the VCO 830 generates test signals or pilot signals that the summation node 860 injects into the signal path of the feed line 160 of the antenna 110. The canceller 750a monitors the response of the system 700 to these pilot signals to adapt the cancellation signal to effectively cancel the interference. More specifically, the canceller 750a monitors residual interference associated with the pilot signals.

The controller 820 controls, refines, or optimizes the operation of the interference canceller 750a using an adaptive approach that learns the value of the magnitude, phase, and delay of the interfering signal by minimizing the energy of the coupled interference. In other words, the controller 820 dynamically adjusts the phase adjuster 220, the channel emulation filter 810, the delay adjuster 225, and the VGA 260 in an adaptive manner that reduces or minimizes the energy of the interference on the antenna 115. As discussed above, the splitter 850 and the power detector 240 monitor the level of interference energy.

Exemplary embodiments of the system 700 can provide interference cancellation in three operational states. In one embodiment, the system 700 operates in a diversity antenna application, whereby the antenna 115 is dormant and the antenna 110 is actively transmitting. In such a diversity application, the canceller 750a can cancel crosstalk imposed on recipient antenna 115 without using pilot signals to characterize the coupling channel. Thus, this first embodiment can correspond to the modes of operation of the system 100 illustrated in FIGS. 1 and 2 and discussed above.

In a second embodiment, the system 700 operates with the antenna 115 and the antenna 110 operating at distinct frequencies. In this scenario, the communication signals transmitting on the antenna 110 couple onto the antenna 115 via a coupling channel. The canceller 750a injects two pilot signals onto the antenna 110, which couple onto the antenna 115. One of these pilot signals has a frequency above the operating frequency of antenna 115, while the other pilot signal has a frequency below the operating frequency of the antenna 115. The canceller uses these pilot signals to address the interference.

In the third embodiment, the canceller 750 cancels crosstalk occurring with the antenna 110 and the antenna 115 operating at essentially the same frequency. The third exemplary embodiment will be discussed in detail. Those skilled in the art will appreciate the applicability of the discussion to the second embodiment described in the immediately preceding paragraph.

With the antenna 110 and the antenna 115 operating at essentially the same frequency, two test or pilot signals inserted onto the antenna 110 can characterize the coupling channel. The cancellation signal provided by the canceller 750a is continuously updated via two the pilot signals, one having a frequency higher than the communication band of the system 700 and one having a frequency lower that the band. For a system that communicates at 2.4 GHz, one pilot signal can have a frequency of 2.45 GHz while the other pilot signal has a frequency of 2.35 GHz, for example. Spectrally positioning the pilot signals outside the communication band avoids interference between the pilot signals and the communication signals. The VCO 830 alternately outputs the high-frequency pilot signal and then the low-frequency pilot signal. Thus, at any particular time during the canceller's operation, the coupler 860 can be injecting one of the pilot signals and the controller 820 can be refining the canceller's operation based on the resulting power measurements from the power detector 240. In one embodiment, the canceller 750a intermittently outputs the pilot signals.

Figure 9:
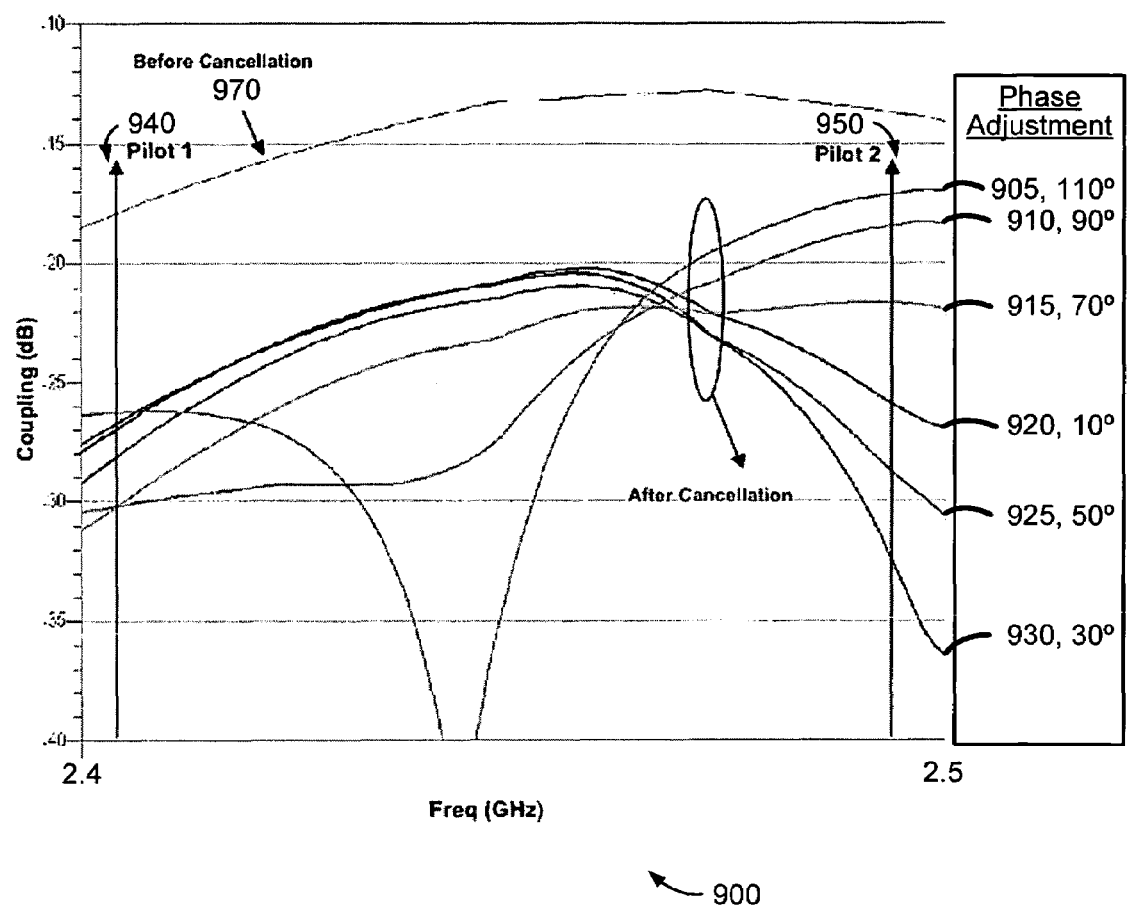
FIG. 9 is a graph of an exemplary family of curves of interference coupling between two antennas as a function of frequency for various phase alignment values in accordance with an embodiment of the present invention.

Turning now to FIG. 9, this figure illustrates a graph of an exemplary family of curves 905, 910, 915, 920, 925, 930 of interference coupling between two antennas 110, 115 as a function of frequency for various phase alignment values in accordance with an embodiment of the present invention.

The frequency range of the plot 900, which extends from 2.4 to 2.5 GHz, can be an exemplary frequency band over which the canceller 750a minimizes interference. That is, the canceller 750a may cancel crosstalk interference across a frequency band that spans from 2.4 to 2.5 GHz.

The curve 970 shows the overall frequency response of the coupling channel. Thus, the antenna 110 couples to antenna 115 a ratio of its energy that ranges between approximately −18.5 dB and approximately −13.5 dB for the frequency band.

The curves 905, 910, 915, 920, 925, 930 each shows the coupling ratio, in dB, for respective phase alignments of 110°, 90°, 70°, 10°, 50°, and 30° following cancellation. Thus, each of these curves 905, 910, 915, 920, 925, 930 illustrates the resulting level of crosstalk that the canceller 175a can achieve by adjusting the phase of the cancellation signal as indicated. For example, if the phase adjuster 220 adjusts the phase of the cancellation signal to 110°, the crosstalk coupling will be approximately −26.3 dB at 2.4 GHz, less than −40 dB at 2.44 GHz, and −17 dB at 2.5 GHz.

The graph 900 further illustrates spectral representations of two overlaid pilot signals 970, 950, one having a frequency near 2.4 GHz and one having a frequency near 2.5 GHz. As discussed above, the canceller 750a can adjust the phase of the cancellation signal based on the relative coupling of these pilot signals 940, 950 between the antennas 110, 115.

Adapting the canceller system using the pilot one signal 940 results in a 90° phase adjustment for optimal cancellation. That is, if the controller 820 manipulates the phase adjuster 220 to minimize the crosstalk coupling of the pilot one signal 940, the controller 820 will select 90° as the optimal phase. The 90° degree phase setting is optimal for the pilot one signal 940 because the 90° curve 910 has the lowest coupling at the frequency of the pilot signal 940.

However, for the pilot two signal 950 a 90° adjustment in phase is not an optimal solution. At the frequency of the pilot two signal 950, a 90° phase adjustment in the cancellation signal provides an interference coupling of approximately −19 dB. That is, the 90° phase adjustment curve 910 has a value of approximately −19 dB at the frequency of the pilot two signal 950. At the frequency of the pilot signal two 950, a phase adjustment of 30° provides an improved level of interference suppression according to the curve 930.

By adapting the cancellation signal based on the two pilot signals 940, 950, rather only one, the controller can provide effective cancellation across a band of frequencies, such as for the range between 2.4 GHz and 2.5 GHz. In one exemplary embodiment of the present invention, the controller 820 averages the phase selection for the pilot one signal 940 with the phase selection for the pilot two signal 950. For example, the controller 820 can average the 90° phase adjustment with the 30° adjustment to compute a 60° phase adjustment.

Rather than a simple average, the controller 820 can also implement an iterative error minimization process to select a phase that provides effective cancellation across a frequency band of interest. According to the plot 900, a phase adjustment of approximately 70° provides optimal minimization of the coupling signal. To identify this 70° operating point, the controller 820 can use the 60° phase adjustment as a starting point and make incremental phase adjustments thereafter. If the feedback signal from the power detector 240 increases as a result of the incremental adjustment, the controller 820 implements a different incremental phase adjustment. In this manner, the controller 820 can start at 60° and adapt via iteration until it finds the optimal 70° degree phase adjustment. The controller 820 can continually refine the cancellation signal during normal operations, to respond to changing conditions such as environment effects and frequency drift.

The controller 820 can also use other empirical search or optimization methodologies known to those skilled in the art. In one exemplary embodiment of the present invention, a coordinate-descent approach, as described in U.S. patent application Ser. No. 10/620,477, discussed above, provides search and optimization to identify acceptable model parameters based measuring the system's response to test signal stimuli.

Figure 10:
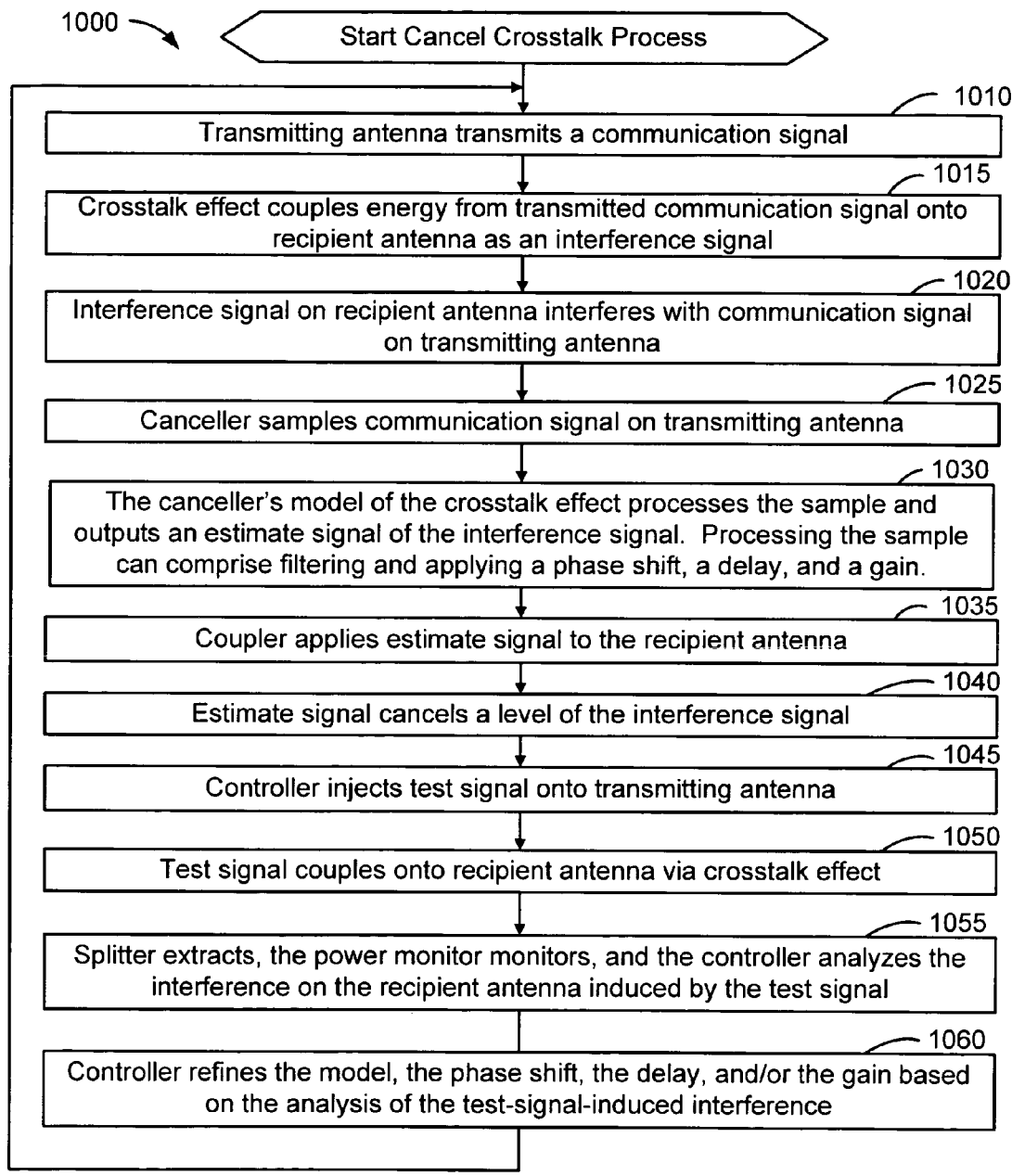
FIG. 10 is a flow chart illustrating an exemplary process for canceling crosstalk or interference on an antenna according to an embodiment of the present invention

Turning now to FIG. 10, this figure illustrates a flowchart of an exemplary process 1000, entitled Cancel Crosstalk, for canceling crosstalk or interference on an antenna 115 according to an embodiment of the present invention. The steps of Process 1000 will be discussed with exemplary reference to the system 700 of FIGS. 7 and 8, which are discussed above.

Certain steps in this process or the other exemplary processes described herein must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

At Step 1010, the first step in Process 1000, the transmitting antenna 110 transmits a communication signal. A transmitter (not illustrated) can supply the transmitting signal to the feed line 160. The communication signal can be encoded with voice information or data, for example. The transmitting antenna 110 outputs a radiation pattern that a remote communication device (not illustrated) may receive.

At Step 1015, a crosstalk effect 180, 185, 190 couples energy of the transmitted communication signal from the transmitting antenna 110 onto the recipient antenna 115. An interference signal, carried on the recipient antenna 115, comprises the interference. As discussed above, the recipient antenna 115 may also be transmitting communication signals contemporaneous with carrying the imposed interference.

At Step 1020, the interference signal on the recipient antenna 115 interferes with the operation or function of the transmitting antenna 110. The interference can distort the field pattern of the transmitting antenna 115 or compromise the integrity of the communication signal and/or receiver sensitivity.

At Step 1025, the canceller 175*a* samples the communication signal on the transmitting antenna 110. Specifically, the splitter 840 taps off a portion of the signals on the feed line 160 of the transmitting antenna 110.

At Step 1030, the model 825 of the canceller 750*a* processes the sample of the communication signal. Based on this processing, the model 825 outputs an estimate of the interference signal that the recipient antenna 115 carries. A cancellation signal can comprise the estimate. The model 875 processes the sample signal with the phase adjuster 220, the emulation filter 810, the delay adjuster 225, and the VGA 260. The phase adjuster 220 applies a phase delay to the sample signal. The emulation filter 810 filters the sample signal according to a filter parameter. The delay adjuster 225 delays the sample signal by a time. The VGA 260 applies a gain to the sample signal to provide amplification.

At Step 1035, summation node 870 applies the estimate or cancellation signal to the recipient antenna 115. At Step 1040, the cancellation signal mixes with and cancels the interference signal on the recipient antenna 115. The cancellation signal typically cancels a substantial portion of the interference signal, but not necessarily all of it. That is, a residual level of interference may remain un-canceled.

At Step 1045, the controller 820 outputs a signal to the VCO 830. In response, the VCO 830 generates a test or pilot signal 940, 950 of known frequency, typically distinct from the frequency of the communication signal. The node 860 places the test signal 940, 950 on the feed line 160 of the transmitting antenna 110.

At Step 1050, the test signal 940, 950 couples onto the recipient antenna 115 via one or more crosstalk effects 180, 185, 190. For example, a portion of the energy in the test signal 940, 950 may transfer to the recipient antenna 115 via free space coupling.

At Step 1055, the splitter 850 taps a portion of the interference due to the test signal 940, 950 from the feed line 165 of the recipient antenna 115. The power monitor 240 measures the power level of the extracted signal. The controller 820 analyzes the extracted signal. Specifically, the controller 820 determines the level of power in the extracted signal at the frequency of the test signal 940, 950. A more detailed discussion of the controller's processing or analysis of the extracted signal or test signal 940, 950 is provided above with reference to FIGS. 7, 8, and 9.

At Step 1060, the controller 820 adjusts the modeling, the phase shift, the delay, and the gain in a dynamic manner in response to Step 1055. That is, the controller 820 adjusts the respective parameters or operating points of the phase adjuster 220, the emulation filter 810, the delay adjuster 225, and the VGA 260. These adjustments improve the model's function and yield iterative improvements or refinements in the cancellation signal's effectiveness. The more detailed discussion of the adaptation is provided above with reference to FIGS. 7, 8, and 9. Following Step 1060, Process 1000 iterates Steps 1010–1060.

Although a system in accordance with the present invention can comprise a circuit that cancels, corrects, or compensates for crosstalk imposed on one communication signal by another signal, those skilled in the art will appreciate that the present invention is not limited to this application and that the embodiments described herein are illustrative and not restrictive. Furthermore, it should be understood that various other alternatives to the embodiments of the invention described here may be employed in practicing the invention. The scope of the invention is intended to be limited only by the claims below.

What is claimed is:

1. A method for suppressing an interference signal imposed by a first antenna on a second antenna, comprising:
   sampling a transmitted signal on the first antenna;
   processing the sampled signal according to a parameter to generate an estimate of the interference signal;
   applying the estimate of the interference signal to the second antenna to suppress the interference signal; and
   varying the parameter in response to monitoring the suppressed interference signal,
   wherein processing the sampled signal comprises filtering the sampled signal with a filter having a frequency response, and wherein varying the parameter comprises adjusting the frequency response.

2. The method of claim 1, wherein:
   the interference signal has a first phase;
   the estimate of the interference signal has a second phase;
   the parameter comprises a phase shift;
   processing the sampled signal further comprises applying the phase shift to the sampled signal; and
   the varying step comprises adjusting the phase shift to match the second phase to the first phase.

3. The method of claim 1, wherein the estimate of the interference signal comprises a cancellation signal.

4. The method of claim 1, wherein:
   the processing step comprises:
     applying a phase shift to the sampled signal;
     delaying the sampled signal by a time; and
     amplifying the sampled signal according to a gain; and
   varying the parameter further comprises adjusting the phase shift, the time, and the gain.

5. The method of claim 1, wherein the transmitted signal comprises a test signal and a communication signal.

6. The method of claim 1, wherein the interference signal is imposed by the first antenna on the second antenna via an interference effect and wherein the method further comprises the steps of:
   generating a pilot signal;
   applying the pilot signal to the first antenna;
   transferring at least a portion of the pilot signal from the first antenna to the second antenna via the interference effect; and
   specifying a model of the interference effect based on monitoring the transferred portion of the pilot signal, wherein
   the transmitted signal comprises a communication signal, and
   processing the sampled signal comprises applying the specified model to the communication signal.

7. The method of claim 1, wherein monitoring the suppressed interference signal comprises tapping power from a feed line of the second antenna and measuring the tapped power.

8. A method for suppressing an interference signal imposed by a first antenna on a second antenna, comprising:
   sampling a transmitted signal on the first antenna;
   processing the sampled signal according to a parameter to generate an estimate of the interference signal;
   applying the estimate of the interference signal to the second antenna to suppress the interference signal;
   varying the parameter in response to monitoring the suppressed interference signal; and
   transmitting, on the first antenna, a first test signal having a first frequency, a second test signal having a second frequency, and a communication signal having a third frequency,
   wherein the third frequency is between the first frequency and the second frequency, and
   wherein the sampling step comprises sampling the first transmitted test signal and sampling the second transmitted test signal.

9. A method for reducing interference on an antenna system, comprising:
   transmitting a test signal on a first antenna;
   coupling a portion of the test signal from the first antenna to a second antenna via an interference effect;
   defining a model of the interference effect based on processing the test signal;
   responsive to transmitting a communication signal on the first antenna, coupling the interference onto the second antenna via the interference effect;
   outputting an estimate of the interference in response to processing the communication signal with the model; and
   applying the estimate to the second antenna to reduce the interference, wherein the model comprises a filter and wherein defining the model comprises adjusting the filter.

10. The method of claim 9, wherein processing the test signal comprises monitoring the portion of the test signal coupled to the second antenna.

11. The method of claim 9, wherein the interference effect comprises free space coupling.

12. The method of claim 9, wherein the interference effect comprises dielectric leakage.

13. The method of claim 9, wherein the interference effect comprises surface wave coupling.

14. The method of claim 9, wherein transmitting the test signal on the first antenna comprises feeding the test signal onto a feed line of the first antenna via a first coupler and wherein applying the estimate to the second antenna comprises feeding the test signal onto a feed line of the second antenna via a second coupler.

15. A method for reducing interference on an antenna system, comprising:
   transmitting a test signal on a first antenna;
   coupling a portion of the test signal from the first antenna to a second antenna via an interference effect;
   defining a model of the interference effect based on processing the test signal;
   responsive to transmitting a communication signal on the first antenna, coupling the interference onto the second antenna via the interference effect;
   outputting an estimate of the interference in response to processing the communication signal with the model; and
   applying the estimate to the second antenna to reduce the interference, wherein applying the estimate to the second antenna comprises subtracting the estimate from the interference and the portion of the test signal coupled to the second antenna via the crosstalk effect.

16. A system, for canceling a signal coupled onto a dormant antenna by an active antenna, comprising:
   a first coupler, comprising a port that connects to a feed line of the dormant antenna, for feeding a sample of the signal to a signal processing circuit; and a second coupler comprising a port for feeding a cancellation signal to the feed line, wherein the signal processing circuit generates the cancellation signal based on amplifying and shifting the sampled signal, wherein the first coupler comprises a splitter and the second coupler comprises a summation node.

17. The system of claim 16, wherein:

amplifying the sampled signal comprises applying a gain to the sampled signal;

shifting the sampled signal comprises applying a phase shift to the sampled signal; and the system further comprises:

a third coupler for obtaining a feedback signal from the feed line; and a controller for adjusting the gain and the phase shift based on the feedback signal.

* * * * *